United States Patent
Kuang et al.

(10) Patent No.: US 11,641,347 B2
(45) Date of Patent: May 2, 2023

(54) QUANTUM-SAFE CRYPTOGRAPHIC METHODS AND SYSTEMS

(71) Applicant: Quantropi Inc., Ottawa (CA)

(72) Inventors: Randy Kuang, Ottawa (CA); Maria Perepechaenko, Ottawa (CA)

(73) Assignee: Quantropi Inc., Ottawa (CA)

( * ) Notice: Subject to any disclaimer, the term of this patent is extended or adjusted under 35 U.S.C. 154(b) by 0 days.

(21) Appl. No.: 17/691,295

(22) Filed: Mar. 10, 2022

(65) Prior Publication Data
US 2022/0311752 A1    Sep. 29, 2022

Related U.S. Application Data

(63) Continuation-in-part of application No. PCT/CA2021/050319, filed on Mar. 10, 2021.

(Continued)

(51) Int. Cl.
*H04L 9/40* (2022.01)
*H04L 9/08* (2006.01)
(Continued)

(52) U.S. Cl.
CPC ........ *H04L 63/0442* (2013.01); *H04L 9/0618* (2013.01); *H04L 9/0825* (2013.01);
(Continued)

(58) Field of Classification Search
None
See application file for complete search history.

(56) References Cited

U.S. PATENT DOCUMENTS

| 5,724,425 A | 3/1998 | Chang et al. |
| 5,996,076 A | 11/1999 | Rowney et al. |

(Continued)

FOREIGN PATENT DOCUMENTS

| CA | 2374189 A1 | 9/2003 |
| CN | 114338030 | * 10/2020 |

(Continued)

OTHER PUBLICATIONS

Wang, Xin et al. "An improved signature model of multivariate polynomial public key cryptosystem against key recovery attack" [ online] AIMS press, Aug. 23, 2019 [retrieved Aug. 23, 2022], Retrieved from the Internet: URL: https://www.aimspress.com/article/doi/10.3934/mbe.2019388 (Year: 2019).*

(Continued)

*Primary Examiner* — Linglan Edwards
*Assistant Examiner* — Joshua Raymond White
(74) *Attorney, Agent, or Firm* — Wolf, Greenfield & Sacks, P.C.

(57) ABSTRACT

Cryptographic methods and systems for key exchange, digital signature and zero-knowledge proof. In the digital signature scenario, there is provided a method of signing a digital document, comprising: obtaining a private cryptographic key associated with the signer; obtaining a digital asset from the digital document; selecting a base data element; computing a plurality of signature data elements from (i) the digital asset, (ii) the base data element and (iii) the private cryptographic key; and transmitting the digital document and the plurality of signature data elements to a recipient over a data network. Provenance of the digital document is confirmable by the recipient carrying out a predefined computation involving the digital document, the signature data elements, a plurality of noise variables and a public cryptographic key corresponding to the private cryptographic key associated with the signer. In the zero-knowledge proof scenario, the digital asset plays the role of a challenge data element.

22 Claims, 16 Drawing Sheets

Related U.S. Application Data

(60) Provisional application No. 63/286,195, filed on Dec. 6, 2021, provisional application No. 63/252,292, filed on Oct. 5, 2021, provisional application No. 63/235,457, filed on Aug. 20, 2021, provisional application No. 63/214,511, filed on Jun. 24, 2021.

(51) Int. Cl.
  *H04L 9/06* (2006.01)
  *H04L 9/32* (2006.01)
  *H04L 9/30* (2006.01)

(52) U.S. Cl.
  CPC .......... *H04L 9/3026* (2013.01); *H04L 9/3218* (2013.01); *H04L 9/3247* (2013.01); *H04L 2209/08* (2013.01)

(56) References Cited

U.S. PATENT DOCUMENTS

| | | | |
|---|---|---|---|
| 6,188,768 | B1 | 2/2001 | Bethune et al. |
| 6,678,379 | B1 | 1/2004 | Mayers et al. |
| 6,801,626 | B1 | 10/2004 | Nambu |
| 7,065,210 | B1 | 6/2006 | Tsujii et al. |
| 7,570,767 | B2 | 8/2009 | Lo |
| 7,991,152 | B2 | 8/2011 | Gueron et al. |
| 9,219,604 | B2 | 12/2015 | Resch et al. |
| 10,484,185 | B2 | 11/2019 | Fu |
| 10,951,404 | B1 | 3/2021 | Kuang |
| 11,170,092 | B1 | 11/2021 | Liang |
| 11,190,343 | B2 * | 11/2021 | Shim .................... H04L 9/3247 |
| 2005/0135627 | A1 | 6/2005 | Zavriyev et al. |
| 2005/0190922 | A1 | 9/2005 | LaGasse |
| 2005/0286723 | A1 | 12/2005 | Vig et al. |
| 2006/0136728 | A1 | 6/2006 | Gentry et al. |
| 2007/0076883 | A1 | 4/2007 | Kuang |
| 2007/0076888 | A1 | 4/2007 | Kuang et al. |
| 2007/0087756 | A1 | 4/2007 | Hoffberg |
| 2007/0160212 | A1 | 7/2007 | Zavriyev et al. |
| 2008/0222734 | A1 | 9/2008 | Redlich et al. |
| 2009/0249068 | A1 | 10/2009 | Farrugia et al. |
| 2010/0329447 | A1 | 12/2010 | Akiyama et al. |
| 2015/0033025 | A1 | 1/2015 | Hoffstein et al. |
| 2015/0172292 | A1 | 6/2015 | Kuang et al. |
| 2016/0164884 | A1 | 6/2016 | Sriram et al. |
| 2017/0063827 | A1 | 3/2017 | Ricardo |
| 2017/0141918 | A1 | 5/2017 | Dubrova et al. |
| 2017/0324553 | A1 | 11/2017 | Ahn |
| 2017/0324554 | A1 * | 11/2017 | Tomlinson ............ H04L 9/0838 |
| 2018/0109377 | A1 | 4/2018 | Fu |
| 2018/0278426 | A1 * | 9/2018 | Tang ..................... H04L 9/083 |
| 2019/0386832 | A1 | 12/2019 | Palyutina et al. |
| 2020/0084030 | A1 | 3/2020 | Nendell |
| 2020/0266980 | A1 | 8/2020 | Grant |
| 2022/0103375 | A1 * | 3/2022 | Elkaafarani ............... H04L 9/14 |
| 2022/0150064 | A1 * | 5/2022 | Akiyama .............. H04L 9/0825 |

FOREIGN PATENT DOCUMENTS

| | | | | |
|---|---|---|---|---|
| JP | | 2009-171384 A | 7/2009 | |
| WO | WO 2014/174491 A1 | | 10/2014 | |
| WO | WO 2020/098833 A2 | | 5/2020 | |
| WO | WO-2021009860 A1 * | | 1/2021 | .......... H04L 9/0869 |
| WO | WO 2021/248226 A1 | | 12/2021 | |
| WO | WO 2021/248227 A1 | | 12/2021 | |

OTHER PUBLICATIONS

Office Action dated Sep. 29, 2020 in connection with U.S. Appl. No. 16/921,583.
Notice of Allowance dated Jan. 22, 2021 in connection with U.S. Appl. No. 16/921,583.
International Search Report and Written Opinion dated Jun. 1, 2022 in connection with International Application No. PCT/CA2022/050349.
International Search Report and Written Opinion dated May 14, 2021 in connection with International Application No. PCT/CA2021/050319.
International Search Report and Written Opinion dated Apr. 15, 2021 in connection with International Application No. PCT/CA2021/050147.
Bourgain et al., Character sums and deterministic polynomial root finding in finite fields. arXiv:1308.4803v2. Mar. 10, 2014. 11 pages.
Chang et al., Quantum annealing for systems of polynomial equations. Scientific Reports. Jul. 16, 2019;9(1):10258. pp. 1-9. DOI: 10.1038/s41598-019-46729-0.
Ding et al., Multivariate Public Key Cryptography. Sep. 26, 2009. 48 pages. URL:http://www.iis.sinica.edu.tw/papers/byyang/12734-F.pdf [last accessed May 12, 2021].
Horodecki et al., Quantum Entanglement. arXiv:quant-ph/0702225v2. Apr. 20, 2007. 110 pages.
Kasahara, Construction of A New Class of Linear Multivariate Public Key Cryptosystem, K(I)SE(1)PKC. Nov. 7, 2009. 5 pages. URL:https://eprint.iacr.org/2009/546.pdf [last accessed May 12, 2021].
Okyere-Gyamfi et al., An Enhanced Asymmetric Cryptosystem using Multiple Key System. International Journal of Computer Applications. Apr. 2020;176(15):18-26.
Sun et al., Quantum algorithm for polynomial root finding problem. 2014 Tenth International Conference on Computational Intelligence and Security. Nov. 2014, pp. 469-473. DOI: 10.1109/CIS.2014.40.

* cited by examiner

QUANTUM-SAFE CRYPTOGRAPHIC METHODS AND SYSTEMS

CROSS-REFERENCES TO RELATED APPLICATIONS

The present application is a continuation-in-part of PCT International Application No. PCT/CA2021/050319, filed on Mar. 10, 2021, hereby incorporated by reference herein. The present application also claims priority to and the benefit of U.S. Provisional Application Ser. No. 63/214,511, filed on Jun. 24, 2021, U.S. Provisional Application Ser. No. 63/235,457, filed on Aug. 20, 2021, U.S. Provisional Application Ser. No. 63/252,292, filed on Oct. 5, 2021, and U.S. Provisional Application Ser. No. 63/286,195, filed on Dec. 6, 2021, all of which are hereby incorporated by reference herein.

FIELD

The present application relates generally to cryptographic methods and systems and, more particularly to methods and systems for cryptographic key exchange, digital signature and zero-knowledge proof that offer improved security against cracking attempts, even by quantum computers.

BACKGROUND

One application of cryptography is digital encryption involving two parties that use respective digital keys to encrypt digital data that they wish to send to one another. For example, each party may securely store a private key that corresponds to a public key. The public key is made available to other parties (potential senders), but the private key is kept secret. One of the parties acting as a sender of a message can access the other party's (i.e., the recipient's) public key, encrypt the message and send a ciphertext to the recipient. The recipient uses the corresponding (and secretly stored) private key to decrypt the message from the ciphertext.

The private key and the corresponding public key are intertwined in a complex mathematical relationship that is difficult to guess, yet any hypothesis as to the nature of this relationship can be easily tested. As a result, unless one has the correct private key, decryption of the data is difficult; however, it not impossible. In fact, malicious parties throughout the world specialize in reverse engineering mathematical relationships (an act known as "cracking") to obtain a "cracked key". A cracked key is any key that can be used to successfully decrypt a message encrypted with the recipient's public key. In that sense, a cracked key can correspond to the private key but might also be one of possibly several other keys that lead to the same result.

The difficulty of cracking a private key in today's private/public key infrastructure is a function of various factors, such as the complexity of the mathematical relationship, the key length (in bits) and a malicious party's available computing power. The greater the key length and the more complex the mathematical relationship, the more difficult it will be to crack the private key. However, with the advent of quantum computing, the security of a private key previously believed to be uncrackable is now in doubt. Thus, mathematical relationships have to become more complex and keys need to be made even longer in order for the security of the private key to keep up with increases in computing power available to malicious parties.

However, increases in mathematical complexity and key length are counterproductive, as they lead to increases in latency and computational effort. In fact, the mathematical complexity and key lengths required in order to make a private key palatably secure in the face of quantum computing efforts at cracking it would bring digital communication over the internet to a standstill.

Figuratively speaking, the cure is worse than the disease.

Another application of cryptography is a digital signature, which is used in the case where the recipient of a message purportedly sent by a particular sender wishes to verify that the message was truly sent by the particular sender and not by someone else. Accordingly, a digital signature is generated (at the sender) by processing the message and a private key of the sender.

The message (as well as the signature) may be non-confidential in nature, with the goal of the digital signature application being to verify the identity of a purported sender of the message rather than the concealment of information. (In some cases, however, the message may itself be encrypted and therefore may require decryption once provenance is confirmed.)

The private key of the sender is designed to have a mathematical relationship with a public key of the sender, which is made available to potential recipients. (The situation is the reverse from encryption application, where the sender uses the recipient's public key to encrypt a message.) The digital signature generated by the sender may accompany or be part of the message sent to the recipient.

At the recipient, the received message and the received signature (purported to have been sent by a particular sender) are used, together with the public key of the particular sender, for verification purposes. This is referred to as the verification process. The verification process generates a certain outcome in the case where the received message was truly sent by the particular sender, and to not generate that certain outcome otherwise. As such, the sender is sometimes referred to as a "signer" and the recipient is sometimes referred to as a "verifier".

The mathematical relationship is chosen such that, if the particular's sender's private key were indeed used to generate the digital signature, then when the recipient runs the received message, the public key of the given sender and the digital signature through a computation (derived from the aforementioned mathematical relationship), a certain expected outcome will be produced, whereas this outcome would not be produced if another private key had been used to generate the digital signature.

The level of confidence in the result of the verification process depends on how difficult it is to steal or reverse engineer (i.e., "crack") the particular sender's private key. A cracked key does not necessarily match the private key itself, but rather may correspond to a key that is able to produce a "fake" digital signature that leads to the expected outcome when the fake digital signature is run through the computation used in the verification process.

The ability to verify the identity of a purported sender depends, in part, on the recipient being able to access the purported sender's public key from a trusted third-party repository. In contrast, situations arise where a sender wishes to prove that it has knowledge of a secret datum (e.g., knowledge an identity, or knowledge a key—such as the private key corresponding to a public key of an entity that the sender is purporting to be) without ever revealing that datum, and without participation of a third party. This application of cryptography is referred to as the "Zero-Knowledge Proof" (ZKP) application, which is useful in scenarios where authenticity of a sender needs to be verified, but where there is no access to a trusted third party.

Typical ZKP applications of cryptography employ a challenge-and-response protocol, whereby a recipient issues a challenge to a sender (who is trying to prove that they have knowledge of a secret datum), and the sender answers with a response. The challenge is designed to elicit a certain response if the sender has knowledge of the datum and a certain other response otherwise. As the number of challenges increases, it becomes increasingly unlikely that the sender would continue to issue, each time, a response consistent with having knowledge of the datum unless the sender truly did have knowledge of the datum.

It will be appreciated that the challenge-and-response protocol used in a typical ZKP application may require numerous iterations before the recipient has a sufficiently high degree of confidence that the sender has knowledge of the datum. The sheer number of required iterations may make the protocol unacceptably slow in some commercially important situations, such as financial transactions or access control.

SUMMARY

Against this background, there has been developed an encryption technique that is more difficult to crack, is computationally simple and has low latency.

Accordingly, there is provided a method of operating a sender computing apparatus to securely transmit a digital asset to a recipient over a data network. The method includes obtaining a public key of the recipient corresponding to a private key of the recipient; selecting a plurality of noise variables; computing a plurality of different ciphers from (i) the digital asset, (ii) the noise variables and (iii) the public key of the recipient; and transmitting the plurality of ciphers to the recipient over the data network, the digital asset being derivable by carrying out a predefined computation involving the plurality of ciphers and the recipient's private key.

There has also been developed a digital signature verification scheme that is more difficult to crack, is computationally simple and has low latency.

Accordingly, there is provided a method of operating a computing apparatus to authenticate a received message purportedly sent by a given sender, the message comprising a digital asset and a digital signature, the digital signature comprising a plurality of data elements.

The method includes obtaining a public key of the given sender; selecting a plurality of noise variables; computing a plurality of data elements based on the digital asset, the noise variables and the public key of the purported sender; evaluating whether the computed data elements and the data elements of the digital signature obey a predetermined relationship; and in case the predetermined relationship is obeyed, concluding that the message was sent by the given sender, otherwise, concluding that the message was not sent by the given sender.

Accordingly, there is provided a method of operating a computing apparatus to authenticate a received message purportedly sent by a given sender, the message comprising a digital asset and a digital signature, the digital signature comprising a plurality of data elements. The method includes obtaining a public key of the given sender; selecting a plurality of noise variables; computing a plurality of data elements based on the digital asset, the noise variables, and the public key of the purported sender; evaluating whether the computed data elements and the data elements of the signature obey a predetermined relationship; in case the predetermined relationship is not obeyed, concluding that the message was not sent by the given sender. In case the predetermined relationship is obeyed the method includes selecting a plurality of new noise variables; computing a plurality of new data elements based on the digital asset, the new noise variables and the public key of the purported sender; evaluating whether the computed new data elements and the data elements of the signature obey the predetermined relationship; in case the predetermined relationship is not obeyed, concluding that the message was not sent by the given sender; in case the predetermined relationship is obeyed, concluding that the message was sent by the given sender.

There has further been developed is a ZKP protocol that requires only a single iteration between sender and recipient, is more difficult to crack, is computationally simple and has low latency.

Accordingly, there is provided a method of operating a computing apparatus to verify that a given sender has knowledge of a secret, the given sender being associated with a public key. The method includes generating a test data element; sending the test data element to the given sender; receiving a response from the sender, the response comprising a digital signature; selecting a plurality of noise variables; computing a plurality of data elements based on the test data element, the noise variables and the public key of the given sender; evaluating whether the computed data elements and the data elements of the digital signature obey a predetermined relationship; in case the predetermined relationship is obeyed, concluding that the given sender has knowledge of the secret, otherwise, concluding that the given sender does not have knowledge of the secret.

Accordingly, there is provided a method of operating a computing apparatus to verify that a given sender has knowledge of a secret, the given sender being associated with a public key. The method includes generating a test data element; sending the test data element to the given sender; receiving a response from the sender, the response comprising a digital signature; selecting a plurality of noise variables; computing a plurality of data elements based on the test data element, the noise variables and the public key of the given sender; evaluating whether the computed data elements and the data elements of the digital signature obey a predetermined relationship. In case the predetermined relationship is obeyed the method includes selecting a plurality of new noise variables; computing a plurality of new data elements based on the test data element, the new noise variables and the public key of the given sender; evaluating whether the computed new data elements and the data elements of the digital signature obey the predetermined relationship; in case the predetermined relationship is obeyed, concluding that the given sender has knowledge of the secret, otherwise, concluding that the given sender does not have knowledge of the secret.

There is also provided a non-transitory computer-readable storage medium comprising computer-readable instructions which, when read and executed by a processor of a computing apparatus, cause the computing apparatus to carry out any of the methods disclosed herein.

Furthermore, there is provided a computing apparatus comprising: a processor; and a non-transitory memory storing computer-readable instructions. The processor is configured for reading and executing the computer-readable instructions in the memory, thereby to cause the computing apparatus to carry out any of the methods disclosed herein.

DETAILED DESCRIPTION

Use Case 1: Encryption

Figure 1:
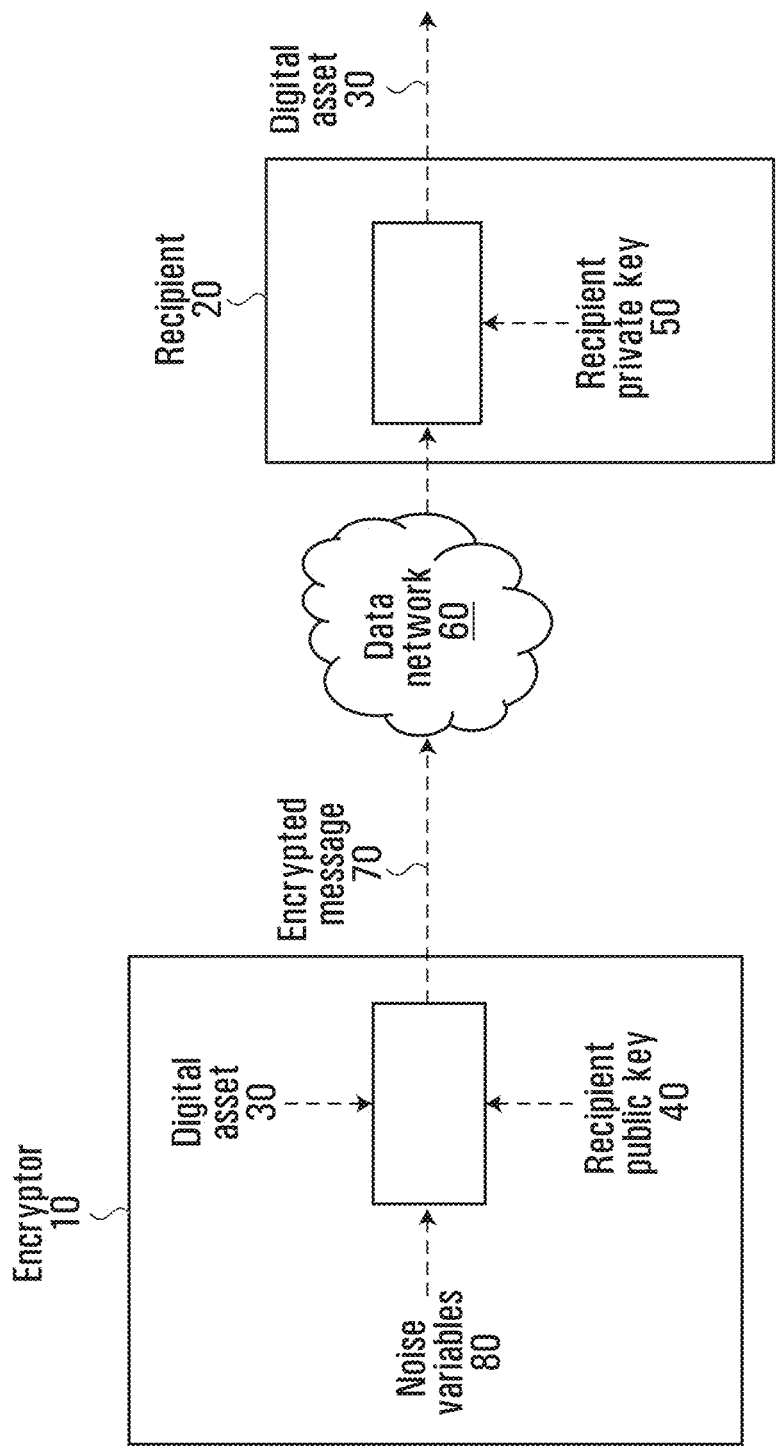
FIG. 1 is a block diagram illustrating two computing apparatuses engaged in digital communications.

With reference to FIG. 1, a specially designed cryptographic key pair (or simply "key pair") can be used in an asymmetric cryptography scenario between a sender (hereinafter an "encryptor") 10 and a recipient 20. The encryptor 10 encrypts a digital asset 30 into an encrypted message (also referred to as a ciphertext) 70 using the recipient's "public key" 40. In various non-limiting embodiments, the digital asset 30 may be a file, a document or a key (such as may be used for encryption of a subsequent digital asset). The recipient's public key 40 can be made available (e.g., transmitted over the Internet or another data network 60 or combination of networks) to entities (such as the encryptor 10) who wish to securely communicate with the recipient 20. The recipient 20 decrypts the digital asset 30 from the encrypted message 70 using the recipient's "private key" 50.

Due to special design of the key pair 40, 50 and the use of noise variables 80 (as will be described herein below), the private key 50 is extremely difficult to obtain from the public key 40, even after observing multiple encrypted messages 70. This makes the present encryption scheme highly secure.

Design of Key Pair

Figure 2:
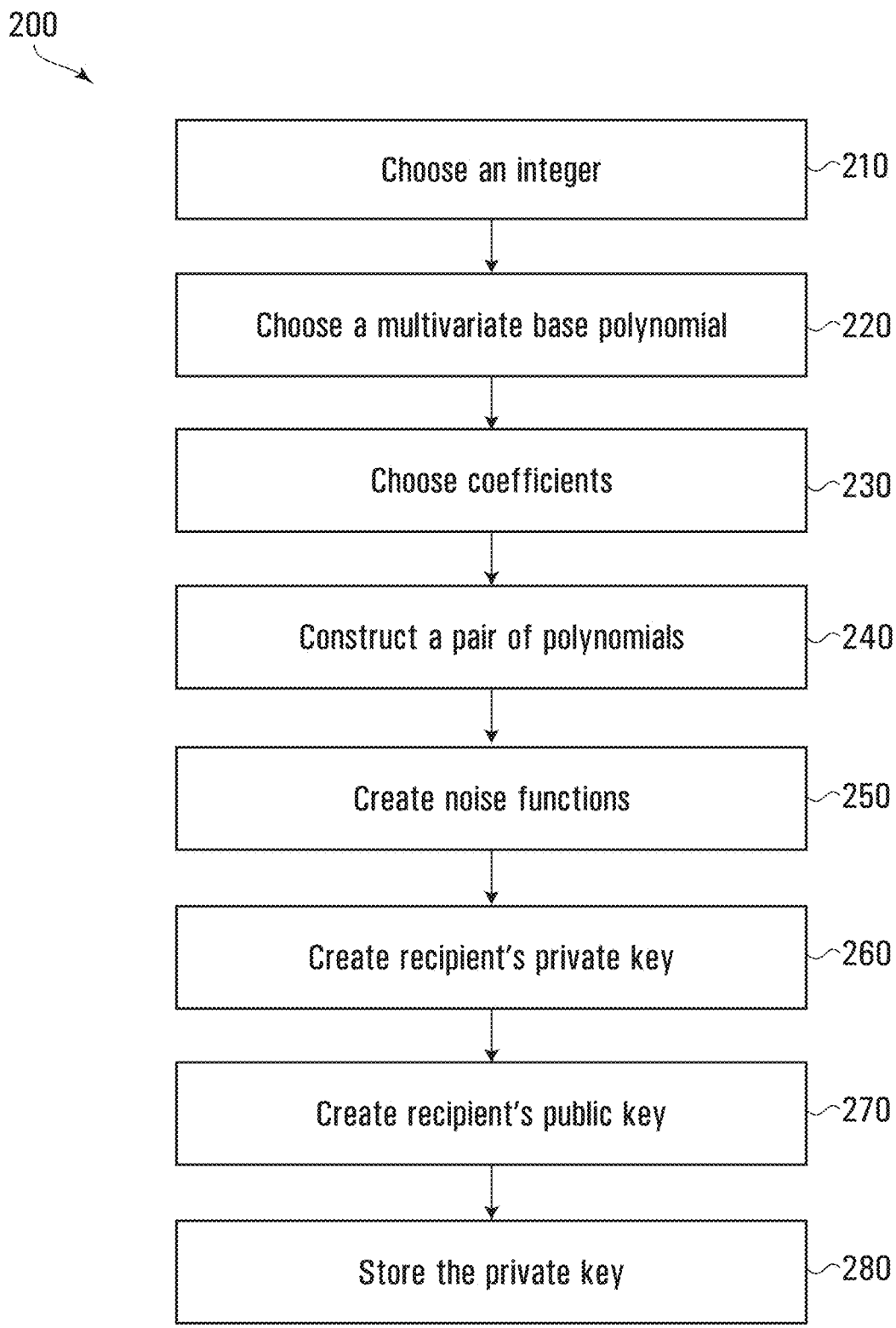
FIG. 2 is a flowchart showing steps in an example key generation process for determining the components of a recipient's private and public keys, in accordance with a non-limiting embodiment.

FIG. 2 shows a key generation process 200 for determining the components (data elements) of the recipient's private and public keys, in accordance with a non-limiting embodiment. The key generation process 200 may be carried out by a key generation entity. The key generation entity could be implemented within the recipient 20 itself, but could also be implemented by a third party that publishes the recipient's public key 40 and guarantees secure delivery of the recipient's private key 50 to the recipient 20 (e.g., out-of-band or via manual delivery). The steps in the key generation process 200 include various sub-steps, and not all steps or sub-steps need be performed in the order described.

Step 210:

The key generation entity chooses an integer p for modulo arithmetic; p may or may not be a prime number, although in some embodiments, it may be preferable that p be prime. In the following, $\varphi(\bullet)$ represents Euler's totient function and therefore $\varphi(p)$ equals the totient function of p. Furthermore, all computations described below for Use Case 1 are mod p. In some embodiments p can have a value at least as great as $2^6$, $2^8$, $2^{10}$, $2^{12}$, $2^{14}$ or $2^{16}$, or even more.

Step 220:

The key generation entity chooses a multivariate base polynomial $B(x_0, x_1, \ldots, x_m)$ of order n, which can be an arbitrary integer. There is no particular limitation on the value of n. Non-limiting examples for the value of n include 3, 4, 5, 6, 7, 8, 9, 10 or higher.

The multivariate base polynomial $B(x_0, x_1, \ldots, x_m)$ can be rewritten as a polynomial of a single variable $x_0$:

$B(x_0, x_1, \ldots, x_m) = \sum_{i=0}^{n} b_i(x_1, \ldots, x_m) x_0^i$ where $b_i(x_1, \ldots, x_m) = \sum_{j=0}^{l} b_{ij} X_j$ with $X_j = \prod_{k=1}^{m} x_k^{j_k}$ as a monomial of variables $x_1, x_2, \ldots, x_m$, in other words each of the coefficients $b_i(x_1, \ldots, x_m)$ is itself a multivariate polynomial with its own coefficients.

As such, $b_i(x_1, \ldots, x_m)$ can be considered as a multivariate polynomial in m variables, where such variables will be referred to as "noise variables" $x_1, \ldots, x_m$. As will be shown later on, these noise variables, whose values are selected at runtime by the encryptor 10, add to the security of the encryption process (to be described herein below with reference to FIG. 3).

The value of m (i.e., the number of noise variables) is a system variable that can be arbitrarily set to any positive integer, without any particular limitation except for security considerations, i.e., the higher the value of m, the greater the security level, all other variables being equal. Non-limiting examples for the value of m include 3, 4, 5, 6, 7, 8, 9, 10 or higher.

Step 230:

The key generation entity chooses the coefficients of a pair of polynomials $f(\bullet)$ and $h(\bullet)$ of degree $\lambda$:

$$f(x_0) = \sum_{j=0}^{\lambda} f_j x_0^j$$

$$h(x_0) = \sum_{j=0}^{\lambda} h_j x_0^j$$

By keeping the order of each of $f(\bullet)$ and $h(\bullet)$ relatively low (such as by keeping $\lambda$ equal to 1, 2 or 3, for example), these polynomials have analytically derivable roots, which will be useful as will be shown later on.

Step 240:
The key generation entity constructs a pair of product polynomials, $P(x_0, x_1, \ldots, x_m)$ and $Q(x_0, x_1, \ldots, x_m)$, by multiplying the base polynomial $B(x_0, x_1, \ldots, x_m)$ with the lower-order polynomials $f(\bullet)$ and $h(\bullet)$, respectively:

$$P(x_0, x_1, \ldots, x_m) = B(x_0, x_1, \ldots, x_m) f(x_0) = n_{0p}(x_1, \ldots, x_m) + \Sigma_{i=0}^{n+\lambda} p_i(x_1, \ldots, x_m) x_0^i + n_{np}(x_1, \ldots, x_m) x_0^{n+\lambda}$$

$$Q(x_0, x_1, \ldots, x_m) = B(x_0, x_1, \ldots, x_m) h(x_0) = n_{0q}(x_1, \ldots, x_m) + \Sigma_{i=0}^{n+\lambda} q_i(x_1, \ldots, x_m) x_0^i + n_{nq}(x_1, \ldots, x_m) x_0^{n+\lambda}$$

where $$p_0(x_1, \ldots, x_m) = p_0 = f_0 b_0(x_1, \ldots, x_m) - n_{0p}(x_1, \ldots, x_m)$$

$$q_0(x_1, \ldots, x_m) = q_0 = h_0 b_0(x_1, \ldots, x_m) - n_{0q}(x_1, \ldots, x_m)$$

$$p_{n+\lambda}(x_1, \ldots, x_m) = p_{n+\lambda} = f_\lambda b_n(x_1, \ldots, x_m) - n_{np}(x_1, \ldots, x_m)$$

$$q_{n+\lambda}(x_1, \ldots, x_m) = q_{n+\lambda} = h_\lambda b_n(x_1, \ldots, x_m) - n_{nq}(x_1, \ldots, x_m)$$

$$p_i(x_1, \ldots, x_m) = \Sigma_{s+t=i} f_s b_t(x_1, \ldots, x_m), \quad i=1, 2, \ldots, n+\lambda-1$$

$$q_i(x_1, \ldots, x_m) = \Sigma_{s+t=i} h_s b_t(x_1, \ldots, x_m), \quad i=1, 2, \ldots, n+\lambda-1$$

where $n_{0p}(x_1, \ldots, x_m)$, $n_{0q}(x_1, \ldots, x_m)$, $n_{np}(x_1, \ldots, x_m)$, and $n_{nq}(x_1, \ldots, x_m)$ can be randomly chosen.

Step 250:
The key generation entity creates first pair of "noise functions" $N_{0p}(x_1, \ldots, x_m)$ and $N_{0q}(x_1, \ldots, x_m)$ from $n_{0p}(x_1, \ldots, x_m)$ and $n_{0q}(x_1, \ldots, x_m)$ and a first selected arbitrary number $R_0$, which is an integer (e.g., it can be the output of a pseudo-random number generator if desired):

$$N_{0p}(x_1, \ldots, x_m) = R_0 n_{0p}(x_1, \ldots, x_m)$$

$$N_{0q}(x_1, \ldots, x_m) = R_0 n_{0q}(x_1, \ldots, x_m).$$

In addition, the key generation entity creates a second pair of noise functions $N_{np}(x_0, x_1, \ldots, x_m)$ and $N_{nq}(x_0, x_1, \ldots, x_m)$ from $n_{np}(x_1, \ldots, x_m)$ and $n_{np}(x_1, \ldots, x_m)$, $x_0^{n+\lambda}$ and a second selected arbitrary number Rn:

$$N_{np}(x_0, x_1, \ldots, x_m) = R_n n_{np}(x_1, \ldots, x_m) x_0^{n+\lambda}$$

$$N_{nq}(x_0, x_1, \ldots, x_m) = R_n n_{nq}(x_1, \ldots, x_m) x_0^{n+\lambda}$$

where $R_0$ and $R_n$ are modulo p. It is noted that, unlike $N_{0p}$ and $N_{0q}$, $N_{np}$ and $N_{np}$ are not just a function of $x_1, \ldots, x_m$ but also of $x_0$.

Step 260:
The key generation entity creates the recipient's private key 50 by assembling the following data elements:
A. $R_0$ and $R_n$, and optionally $R_p$ and $R_q$ (see step 270)
B. the coefficients of $f(\bullet)$ (i.e., $f_0, f_1, \ldots, f_\lambda$)
C. the coefficients of $h(\bullet)$ (i.e., $h_0, h_1, \ldots, h_\lambda$)
D. the individual terms $p_0 = f_0 b_0(0, \ldots, 0)$ and $q_0 = h_0 b_0(0, \ldots, 0)$ (or, equivalently, just $b_0(0, \ldots, 0)$, since $f_0$ and $h_0$ are already part of the private key);
The values of the above data elements can be arbitrarily chosen by the key generation entity.

Step 270:
The key generation entity creates the recipient's public key 40 by assembling the following data elements (the integer p can be part of the recipient's public key or can be a known system variable):
A. the coefficients of the first pair of noise functions $N_{0p}(x_1, \ldots, x_m)$, $N_{0q}(x_1, \ldots, x_m)$
B. the coefficients of the second pair of noise functions $N_{np}(x_0, x_1, \ldots, x_m)$, $N_{nq}(x_0, x_1, \ldots, x_m)$
C. the set of coefficients $p_i(x_1, \ldots, x_m)$ for $i=0, 1, 2, \ldots, n+\lambda$, optionally multiplying with $R_p$
D. the set of coefficients $q_i(x_1, \ldots, x_m)$ for $i=0, 1, 2, \ldots, n+\lambda$, optionally multiplying with $R_q$ Step 280:
The key generation entity causes the recipient's private key 50 to be securely stored in a memory of the recipient 20. The key generation entity also causes the recipient's public key 40 to be made available to would-be encryptors such as the encryptor 10.

Encryption Using Public Key

Figure 3:
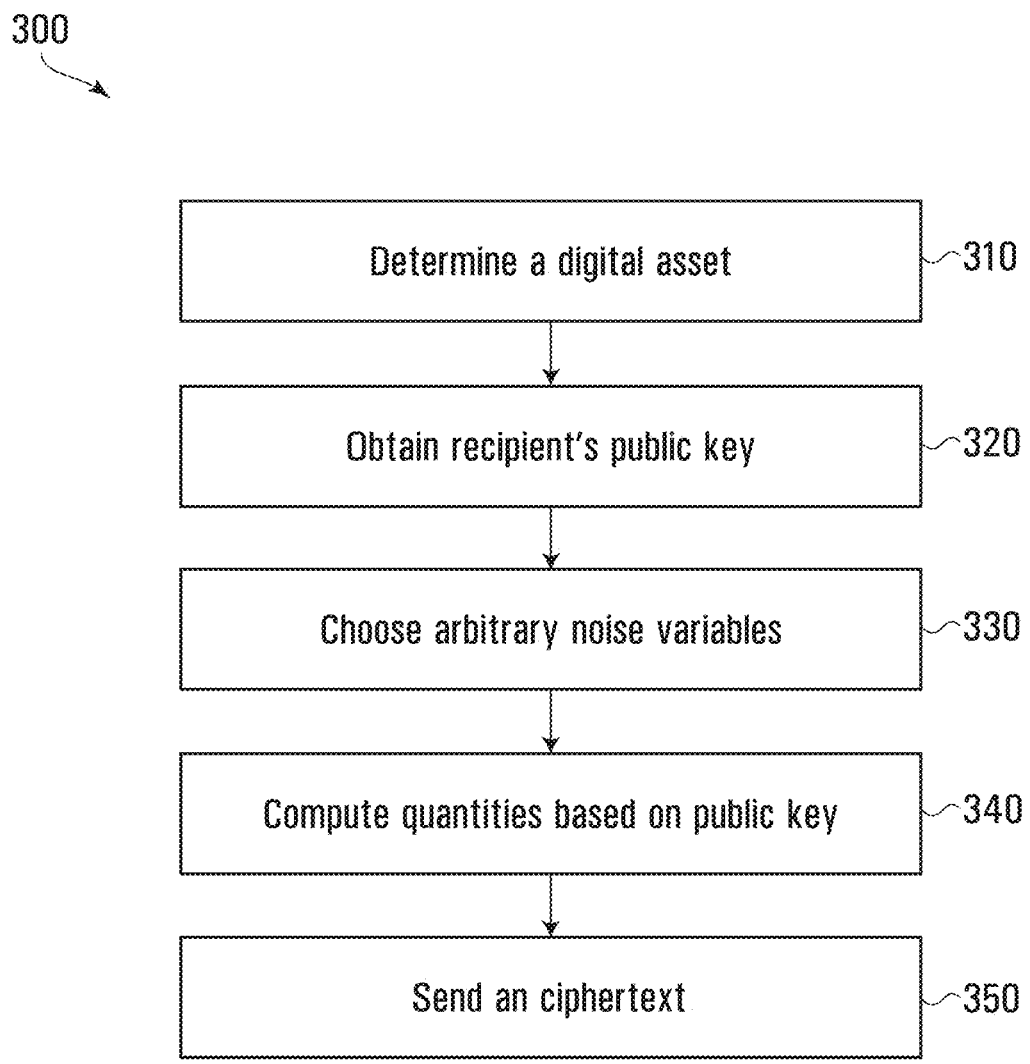
FIG. 3 is a flowchart showing steps in an example encryption process, in accordance with a non-limiting embodiment.

Armed with the public key 40 as defined above, the encryptor 10 may perform an encryption process 300 in accordance with a non-limiting embodiment, now described with reference to FIG. 3. The steps in the encryption process 300 include various sub-steps, and not all steps or sub-steps need be performed in the order described.

Step 310:
The encryptor 10 determines a digital asset $x_0$ from 0 to p−1. The digital asset $x_0$ could be a message or a hash of a message. The message may carry or convey a document, a file, an image, a transaction, a document, a financial instrument, an encryption key or any other information of value. In some embodiments p can have a value at least as great as $2^6, 2^8, 2^{10}, 2^{12}, 2^{14}, 2^{16}, 2^{18}, 2^{20}, 2^{22}, 2^{24}$ or even more.

Step 320:
The encryptor 10 obtains the recipient's public key 40, which includes:
the coefficients of the first pair of noise functions $N_{0p}(x_1, \ldots, x_m)$, $N_{0q}(x_1, \ldots, x_m)$
the coefficients of the second pair of noise functions $N_{np}(x_0, x_1, \ldots, x_m)$, $N_{nq}(x_0, x_1, \ldots, x_m)$
the set of coefficients $p_i(x_1, \ldots, x_m)$ for $i=0, 1, 2, \ldots, n+\lambda$
the set of coefficients $q_i(x_1, \ldots, x_m)$ for $i=0, 1, 2, \ldots, n+\lambda$ Step 330:
The encryptor 10 chooses m arbitrary noise variables $x_1, \ldots, x_m$. For example, these could be random numbers such as may be output from a pseudo-random number generator, and in some embodiments they should be.

Step 340:
The encryptor 10 computes the following quantities, based on the above quantities and the public key 40:

$$P' = \Sigma_{i=0}^{n+\lambda} p_i(x_1, \ldots, x_m) x_0^i; \quad \text{A.}$$

$$Q' = \Sigma_{i=0}^{n+\lambda} q_i(x_1, \ldots, x_m) x_0^i; \quad \text{B.}$$

$$N_{0p} = N_{0p}(x_1, \ldots, x_m) \text{ and } N_{0q} = N_{0q}(x_1, \ldots, x_m); \quad \text{C.}$$

$$N_{np} = N_{np}(x_0, x_1, \ldots, x_m) \text{ and } N_{nq} = N_{nq}(x_0, x_1, \ldots, x_m); \quad \text{D.}$$

Step 350:
The encryptor 10 sends an encrypted message (e.g., ciphertext 70) containing data elements P', Q', $N_{0p}$, $N_{0q}$, $N_{np}$, and $N_{nq}$ (which can be referred to as a "ciphertext tuple") to the recipient 20. On its way from the encryptor 10 to the recipient 20, the ciphertext 70 may traverse the data network 60 (e.g., the Internet), for example.

Decryption Using Private Key

Figure 4:
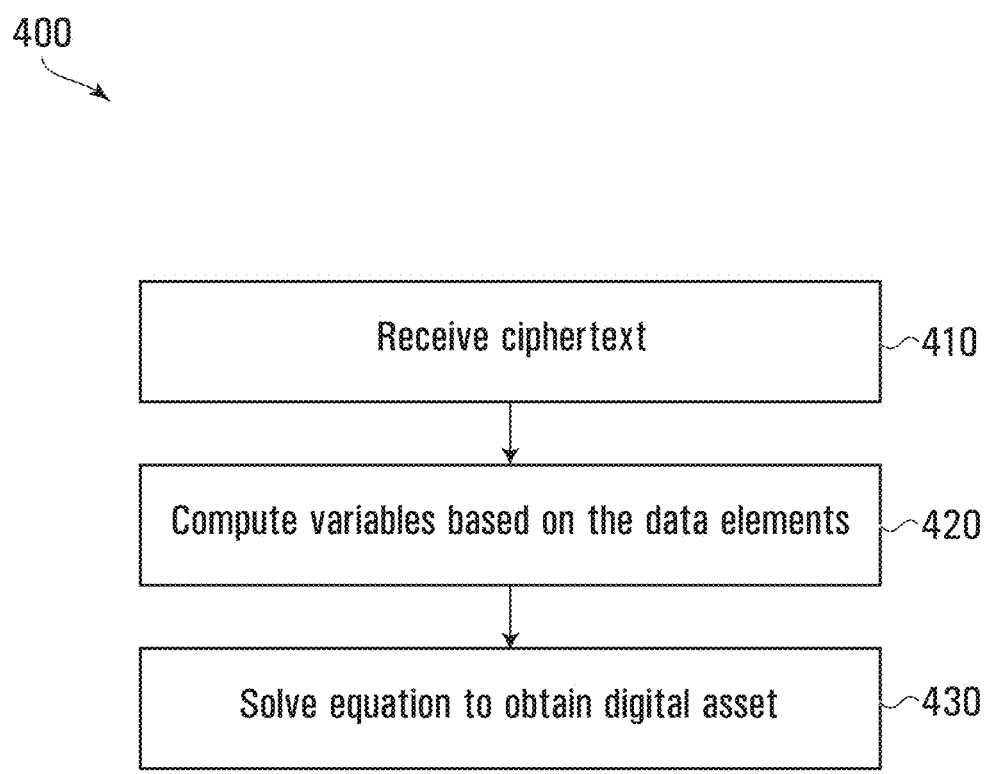
FIG. 4 is a flowchart showing steps in an example decryption process, in accordance with a non-limiting embodiment.

In order to decrypt the digital asset $x_0$, the recipient 20 (which stores the private key 50 corresponding to the public key 40 used by the encryptor 10) may perform a decryption process 400 in accordance with a non-limiting embodiment, now described with reference to FIG. 4. The steps in the decryption process 400 include various sub-steps, and not all steps or sub-steps need be performed in the order described.

Step 410:

The recipient 20 receives the ciphertext 70 containing data elements P', Q', $N_0$ and $N_n$.

Step 420:

The recipient 20 computes the following variables V1 and V2 based on the data elements of the received ciphertext tuple 70 (i.e., P', Q', $N_{0p}$, $N_{0q}$, $N_{np}$ and $N_{nq}$) and based on some of the data elements of the private key 50 held by the recipient 20 (namely, $R_0$, $R_n$, $f_0$, $f_\lambda$, $h_0$, $h_\lambda$, $p_0$ and $q_0$, as well as $R_p$ and $R_q$, as when used):

$$V1 = p_0 + \frac{N_{0p}}{R_0} + \frac{P'}{R_p} + \frac{N_{np}}{R_n},$$

if the optional factor $R_p$ was used in key generation, otherwise the denominator of P' is simply unity.

$$V2 = q_0 + \frac{N_{0q}}{R_0} + \frac{P'}{R_q} + \frac{N_{nq}}{R_n},$$

if the optional factor $R_q$ was used in key generation, otherwise the denominator of Q' is simply unity.

Step 430:

The recipient 20 solves the following equation for x (recalling that the coefficients of f(•) and of h(•) are part of the recipient's private key 50 and therefore known to the recipient 20):

$$\frac{V1}{V2} * h(x) - f(x) = 0.$$

Since each of f(•) and h(•) is of relatively low order (e.g., $\lambda$=1, 2 or 3), the above equation is also of relatively low order and has analytically derivable roots.

Decryption is now complete: the recipient 20 declares solution to above equation (which should be an integer) as being the digital asset $x_0$ that was the subject of the encryption process 300. The decrypted digital asset $x_0$ can be communicated via a graphical user interface, encoded in a signal sent over a data network or stored in a non-transitory memory.

In the case where the above equation (at step 430) has more than one integer-valued solution (for example, two real integer roots if it is a quadratic, two or three real integer roots if it is a cubic), then it is likely that only one of these solutions will make sense in view of the communications context, and it is considered a straightforward task to discriminate between a potential solution that makes sense and one that does not. For example, one simple non-limiting way to ensure that the right choice is made, is to format the digital asset by pre-appending a flag to it and then treating the formatted digital asset as the secret to be encrypted. The flag can be simply generated by XORing each byte each other of the digital asset in encryption and verified in the decryption. The one root that passes the flag verification is then considered to be the digital asset.

Those skilled in the art will appreciate that steps 420 and 430 may be collapsed into a single arithmetic expression involving the plurality of ciphers (data elements of the ciphertext) and the data elements of the private key 50.

It should also be appreciated that the values of m, n and p are predetermined and known to the encryptor 10 and the recipient 20 for the purposes of a given instantiation of the encryption process 300 and the decryption process 400.

Explanation of how it Works

Consideration is now given to explaining why it is the case that a root of the above equation (step 430) corresponds to the digital asset $x_0$.

To this end, it is recalled that:

V1 was computed as $$p_0 + \frac{N_{0p}}{R_0} + \frac{P'}{R_p} + \frac{N_{np}}{R_n}$$

and

V2 was computed as $$q_0 + \frac{N_{0q}}{R_0} + \frac{Q'}{R_q} + \frac{N_{nq}}{R_n},$$

in both cases assuming the optional factors $R_p$ and $R_q$ were used in key generation (otherwise the denominators of P' and Q' are simply 1).

Now considering without $R_p$ and $R_q$, because $P'(x_0, x_1, \ldots, x_m) = \Sigma_{i=0}^{n+\lambda} p_i(x_1, \ldots, x_m) x_0^i$ (see steps 240 and 330) and because of the above definitions of $p_i(x_1, \ldots, x_m)$, $N_{0p}(x_1, \ldots, x_m)$, $N_{0q}(x_1, \ldots, x_m)$, $N_{np}(x_1, \ldots, x_m)$, and $N_{nq}(x_0, x_1, \ldots, x_m)$ (see steps 240 and 250), it follows that the aforementioned quantity V1 is actually equal to $P(x_0, x_1, \ldots, x_m) = B(x_0, x_1, \ldots, x_m)f(x_0)$.

Similarly, because $Q' = \Sigma_{i=0}^{n+\lambda} q_i(x_1, \ldots, x_m) x_0^i$ (see step 330), because $Q(x_0, x_1, \ldots, x_m) = \Sigma_{i=0}^{n+\lambda} q_i(x_1, \ldots, x_m) x_0^i$ (see step 240) and because of the above definitions of $q_i(x_1, \ldots, x_m)$, $N_0(x_1, \ldots, x_m)$ and $N_n(x_0, x_1, \ldots, x_m)$ (see steps 240 and 250), it follows that the aforementioned quantity V2 is actually equal to $Q(x_0, x_1, \ldots, x_m) = B(x_0, x_1, \ldots, x_m)h(x_0)$.

Therefore, when computing the ratio of V1 to V2 at step 430, it is the same as computing the ratio of $P(x_0, x_1, \ldots, x_m)$ to $Q(x_0, x_1, \ldots, x_m)$. In other words:

$$\frac{V1}{V2} = \frac{P(x_0, x_1, \ldots, x_m)}{Q(x_0, x_1, \ldots, x_m)}.$$

Next, it is also recalled (from step 220) that $P(x_0, x_1, \ldots, x_m)$ was defined as $B(x_0, x_1, \ldots, x_m)f(x_0)$ and $Q(x_0, x_1, \ldots, x_m)$ was defined as $B(x_0, x_1, \ldots, x_m)h(x_0)$. Thus, from a mathematical standpoint:

$$\frac{P(x_0, x_1, \ldots, x_m)}{Q(x_0, x_1, \ldots, x_m)} = \frac{f(x_0)}{h(x_0)}$$

Therefore, one has:

$$\frac{V1}{V2} = \frac{f(x_0)}{h(x_0)},$$

from which one obtains:

$$\frac{V1}{V2} * h(x_0) - f(x_0) = 0.$$

As a result, $x_0$ is the solution to (or, of there is more than one solution, is one of the solutions to):

$$\frac{V1}{V2} * h(x) - f(x) = 0.$$

Security Analysis for Use Case 1

It will be appreciated that the values of $x_1, \ldots, x_m$ (i.e, the noise variables) do not affect the decryption process 400 if the correct private key 50 is used, but they make it all the more difficult for someone who does not have the private key 50 to derive it from the public key 40 and the ciphertext 70.

The complexity of obtaining the private key 50 from the public key 40 can be determined as follows:

Leveraging from key construction in terms of transformation in a polynomial vector space, one can write public key coefficients (for an example of n=4 and $\lambda=2$):

$$\begin{bmatrix} p1 \\ p2 \\ p3 \\ p4 \\ p5 \end{bmatrix} = \begin{bmatrix} f1 & f0 & 0 & 0 & 0 \\ f2 & f1 & f0 & 0 & 0 \\ 0 & f2 & f1 & f0 & 0 \\ 0 & 0 & f2 & f1 & f0 \\ 0 & 0 & 0 & f2 & f1 \end{bmatrix} \begin{bmatrix} b0 \\ b1 \\ b2 \\ b3 \\ b4 \end{bmatrix}$$

Then with the reverse transformation, one has:

$$\vec{b} = \begin{bmatrix} b0 \\ b1 \\ b2 \\ b3 \\ b4 \end{bmatrix} = \begin{bmatrix} f1 & f0 & 0 & 0 & 0 \\ f2 & f1 & f0 & 0 & 0 \\ 0 & f2 & f1 & f0 & 0 \\ 0 & 0 & f2 & f1 & f0 \\ 0 & 0 & 0 & f2 & f1 \end{bmatrix}^{-1} \begin{bmatrix} p1 \\ p2 \\ p3 \\ p4 \\ p5 \end{bmatrix}$$

Then one can write the transformation with reference to the base polynomial:

$$T_b = \begin{bmatrix} b1 & b0 & 0 & 0 & 0 \\ b2 & b1 & b0 & 0 & 0 \\ b3 & b2 & b1 & b0 & 0 \\ b4 & b3 & b2 & b1 & b0 \\ 0 & b4 & b3 & b2 & b1 \end{bmatrix}$$

Using $T_b$, we can calculate the second polynomial $h(x)$'s coefficients:

$$\begin{bmatrix} h0 \\ h1 \\ h2 \\ 0 \\ 0 \end{bmatrix} = \begin{bmatrix} b1 & b0 & 0 & 0 & 0 \\ b2 & b1 & b0 & 0 & 0 \\ b3 & b2 & b1 & b0 & 0 \\ 0 & b3 & b2 & b1 & b0 \\ 0 & 0 & b3 & b2 & b1 \end{bmatrix}^{-1} \begin{bmatrix} q1 \\ q2 \\ q3 \\ q4 \\ q5 \end{bmatrix}$$

Based on this process, knowing public key P' and Q', one can crack the private key $\{\vec{b}_i, \vec{f}_i, \vec{h}_i\}$ by brute-forcing $f_0$, $f_1$, and $f_2$. The complexity is $O(p^3)$ or in a general case, $O(p^{\lambda+1})$.

Turning now to the issue of the size of the public key, private key and cipher in Use Case 1 (in terms of the number of data elements over GF(p)), the following will be noticed:

The size of the public key (see step 270)=m[2(n+$\lambda$-1)+2]=2m(n+$\lambda$);

The size of the private key (see step 260)=2$\lambda$+6 without $R_p$ and $R_q$ and 2$\lambda$+8 with $R_p$ and $R_q$.

Use Case 2: Digital Signature

Digital signatures have a wide variety of commercial applications, including the signed transmission of certificates or keys from a certification authority. Another application of digital signatures is the establishment of a sender's identity when sending digital files, messages, legal documents or electronic funds (including digital fiat currency and decentralized currency such as Bitcoin and other cryptocurrencies). Digital signatures are also used to access, add to, modify or confirm elements of a blockchain database in various financial, industrial, commercial and consumer applications.

In this use case, now described with reference to a first variant in FIG. 5A, an entity (referred to as a "verifier") 550 wishes to verify that a received digital asset 520, purportedly sent by a given sender, was indeed sent by the given sender. Assuming this to be the case, the sender 510 (referred to as a "signer") will have generated a digital signature 530 by signing the digital asset 520 with a private key 540 (that is part of a specially designed private/public key pair 540, 570 associated with the signer 510). The signer 510 then sends the digital asset 520 and the signature 530 to the verifier 550.

The verifier 550 receives both the digital asset 520 and the digital signature 530. The digital signature 530 is purported to have come from the signer 510, but the verifier 550 must verify this to be true. As such, the verifier 550 carries out a verification process on the received digital asset 520 and the accompanying digital signature 530. The verification process involves evaluating mathematical expressions based on (i) the received digital asset 520, (ii) the public key 570 associated with the signer 510 and (iii) a set of "noise variables" 580. Such noise variables 580 are selected by the verifier 550 at its discretion and without involving the signer 510. The verifier 550 then checks whether the mathematical expressions correspond. If so, the verifier 550 concludes that the signer 510 is the true originator of the received digital asset 520, otherwise, the verifier 550 concludes that the received digital asset 520 was not sent by the signer 510.

Figure 5A:
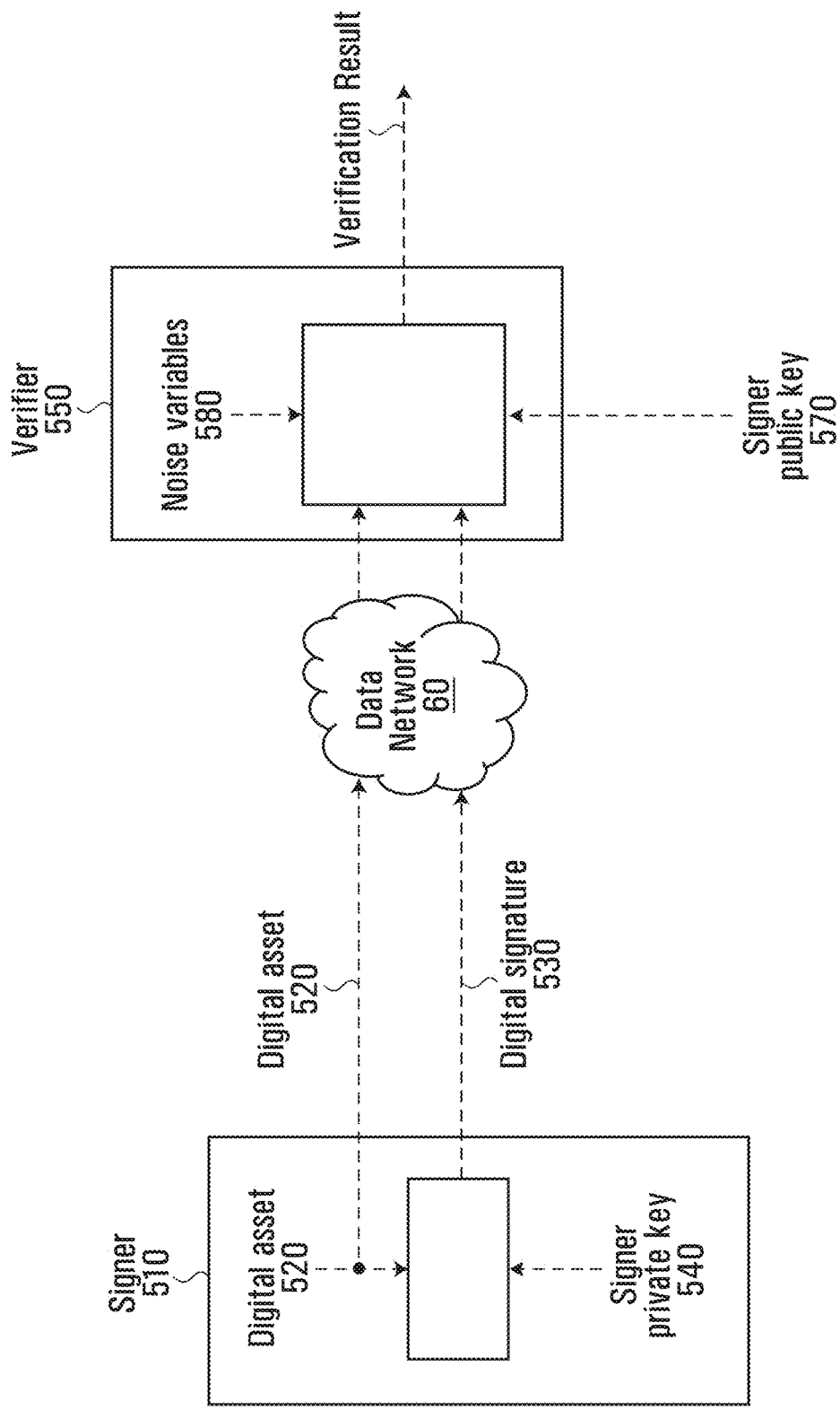
FIGS. 5A and 5B are signal flow diagrams illustrating a digital signature process, in accordance with different non-limiting embodiments.
Figure 5B:
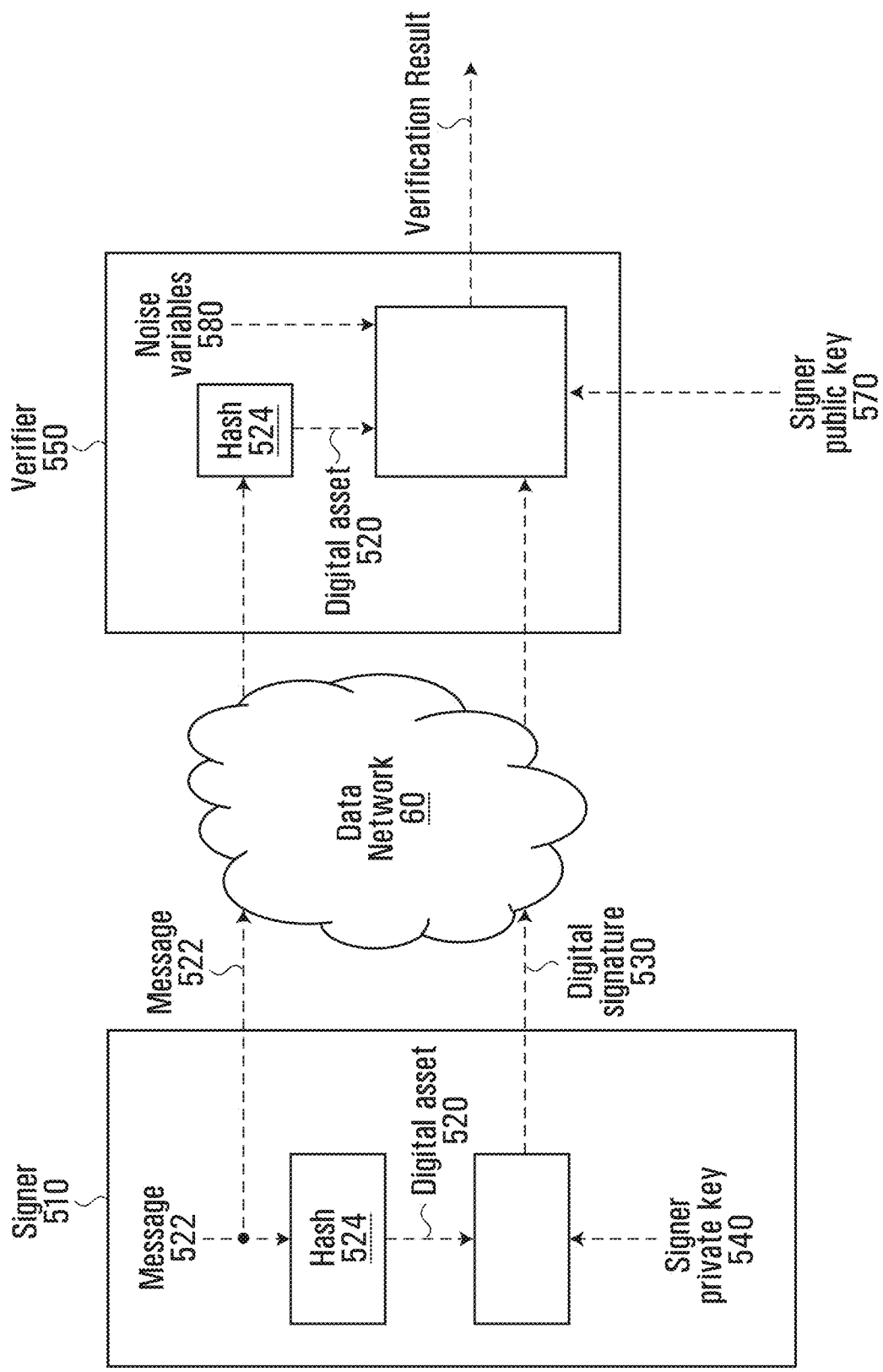

The variant of FIG. 5B is similar to the variant of FIG. 5A, except that it shows the digital asset 520 being generated from a message 522, both at the signer 510 and the verifier 530. This derivation of the digital asset 520 from the message 522 can be done using a cryptographic hash function 524, for example. As such, in this variant, it is the message 522 that is sent with the digital 530 signature, which means that the digital asset 520 is not explicitly sent from the signer 510 to the verifier 530, but rather is implicitly sent, in the sense that it can be derived from the message at either end.

Design of Key Pair

The signer's private/public key pair 540, 570 is specially designed so that regardless of the values selected by the verifier 550 for the noise variables 580, the mathematical expressions computed as part of the verification process will always corresponds. Conversely, a single instance of noncorrespondence of the mathematical expressions will be taken as a sign that the digital signature 530 was not sent by the signer 510.

As a result, even if a malicious party (spoofer) creates a digital signature which somehow causes the computed mathematical expressions to correspond, there is close to zero probability that this would occur a second time if the mathematical expressions were re-computed based on a different set of noise variables (which, it is recalled, are controlled by the verifier 550, not the signer 510). Without the signer's private key 540, it is virtually impossible for the spoofer to derive a "fake signature" that would result in mathematical correspondence to be maintained for an arbitrary set of noise variables. Yet this is precisely what happens if the correct private key 540 is used.

Figure 6:
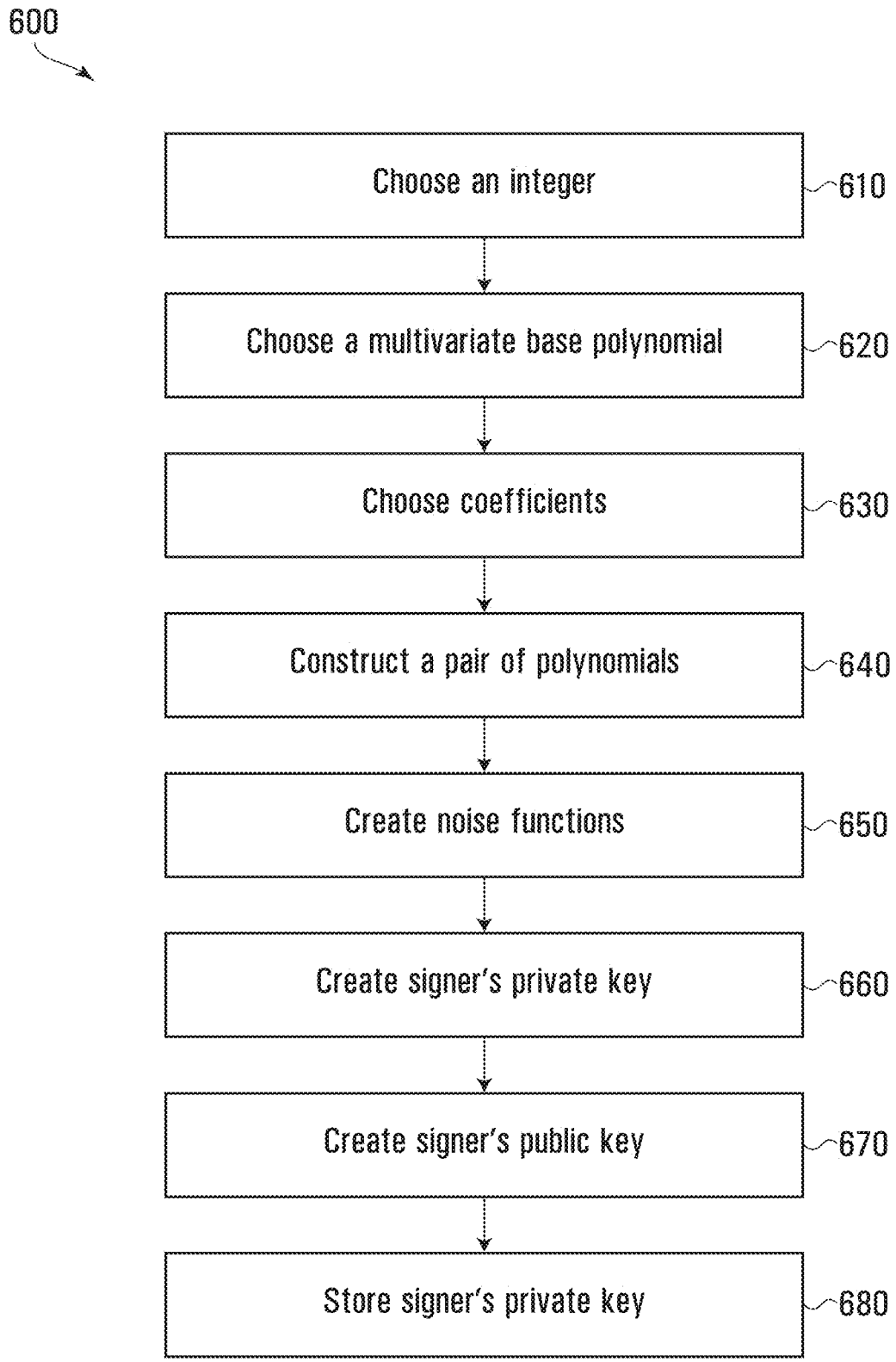
FIG. 6 is a flowchart showing steps in an example key generation process, in accordance with a non-limiting embodiment.

To illustrate this concept in more detail, FIG. 6 shows a key generation process 600 for determining the data elements of a signer's private and public keys, in accordance with a non-limiting embodiment. The key generation process 600 may be carried out by a key generation entity. The key generation entity could be integrated with the signer 510 itself, but it could also be a third party that guarantees secure delivery of the signer's private key 540 to the signer 510 (e.g., out-of-band or via manual delivery) and publishes the signer's public key 570 to interested entities (such as the verifier 550). The steps in the key generation process 600 include various sub-steps, and not all steps or sub-steps need be performed in the order described.

Step 610:

The key generation entity chooses an integer p for modulo arithmetic. In contrast to Step 210 of Use Case 1, where p may be not required to be a prime number, in Use Case 2, p is a prime number and, moreover, should be selected such that $(p-1)/2^y$ is also prime for some integer y. In the following, $\varphi(\bullet)$ continues to represent Euler's totient function. In Use Case 2 (and Use Case 3), all computations in key generation, polynomial computations in signing and verifying processes are mod $\varphi(p)$ because those computations are eventually used in the exponents of modular arithmetic computations. However, the ground modulo in the arithmetic exponentiation is with the prime p. In some embodiments, p is at least as great as $2^6$, $2^8$, $2^{10}$, $2^{12}$, $2^{14}$, $2^{16}$, $2^{18}$, $2^{20}$, $2^{22}$ or $2^{24}$.

Step 620 (corresponds to step 220 in Use Case 1):

The key generation entity chooses a multivariate base polynomial $B(x_0, x_1, \ldots, x_m)$ of order n, which can again be an arbitrary integer. There is no particular limitation on the value of n. Non-limiting examples for the value of n include 3, 4, 5, 6, 7, 8, 9, 10 or higher.

The multivariate base polynomial $B(x_0, x_1, \ldots, x_m)$ can be rewritten as a polynomial of a single variable $x_0$ in which the coefficients are $b_i(x_1, \ldots, x_m)$:

$$B(x_0, x_1, \ldots, x_m) = \Sigma_{i=0}^n b_i(x_1, \ldots, x_m) x_0^i$$

where $b_i(x_1, \ldots, x_m) = \Sigma_{k=0}^m \Sigma_{j=0}^l b_{ij} (\Pi_{k=1}^m x_k^{j_k})$.

Here again, $b_i(x_1, \ldots, x_m)$ can be considered as a multivariate polynomial in m variables, where such variables will be referred to as "noise variables" $x_1, \ldots, x_m$. As will be shown later on, these noise variables, whose values are selected at runtime by the encryptor, add to the security of the encryption process.

The value of m (i.e., the number of noise variables) is a system variable that can be arbitrarily set to any positive integer, without any particular limitation except for security consideration. Non-limiting examples for the value of m include 3, 4, 5, 6, 7, 8, 9, 10 or higher.

Step 630 (corresponds to step 230 in Use Case 1):

The key generation entity chooses the coefficients of a pair of polynomials $f(\bullet)$ and $h(\bullet)$ of degree $\lambda$:

$$f(x_0) = \Sigma_{j=0}^\lambda f_j x_0^j$$

$$h(x_0) = \Sigma_{j=0}^\lambda h_j x_0^j$$

over $[0, 1, 2, \ldots, \varphi(p)]$ with $\lambda$ to be any integer greater than 1. In contrast to Use Case 1, the order of each of $f(\bullet)$ and $h(\bullet)$ need not kept relatively low (such as by keeping $\lambda$ equal to 1, 2 or 3, for example), because there is no decryption process.

Step 640 (corresponds to step 240 in Use Case 1):

The key generation entity constructs a pair of product polynomials, $P(x_0, x_1, \ldots, x_m)$ and $Q(x_0, x_1, \ldots, x_m)$, by multiplying the base polynomial $B(x_0, x_1, \ldots, x_m)$ with the polynomials $f(\bullet)$ and $h(\bullet)$, respectively:

$$P(x_0, x_1, \ldots, x_m) = B(x_0, x_1, \ldots, x_m) f(x_0) = \Sigma_{i=0}^{n+\lambda} p_i(x_1, \ldots, x_m) x_0^i$$

$$Q(x_0, x_1, \ldots, x_m) = B(x_0, x_1, \ldots, x_m) h(x_0) = \Sigma_{i=0}^{n+\lambda} q_i(x_1, \ldots, x_m) x_0^i$$

where $$p_0(x_1, \ldots, x_m) = p_0 = f_0 b_0(x_1, \ldots, x_m)$$

$$q_0(x_1, \ldots, x_m) = q_0 = h_0 b_0(x_1, \ldots, x_m)$$

$$p_{n+\lambda}(x_1, \ldots, x_m) = p_{n+\lambda} = f_\lambda b_n(x_1, \ldots, x_m)$$

$$q_{n+\lambda}(x_1, \ldots, x_m) = q_{n+\lambda} = h_\lambda b_n(x_1, \ldots, x_m)$$

$$p_i(x_1, \ldots, x_m) = \Sigma_{s+t=i} f_s b_t(x_1, \ldots, x_m),$$
$$i=1,2,\ldots,n+\lambda-1$$

$$q_i(x_1, \ldots, x_m) = \Sigma_{s+t=i} h_s b_t(x_1, \ldots, x_m),$$
$$i=1,2,\ldots,n+\lambda-1$$

The aforementioned calculations are done mod $\varphi(p)$.

Step 650 (corresponds to step 250 in Use Case 1, with the added constraint that $R_0$ and $R_n$ should be even integers):

The key generation entity creates a first "noise function" $N_0(x_1, \ldots, x_m)$ from $b_0(x_1, \ldots, x_m)$ and a first selected arbitrary number $R_0$:

$$N_0(x_1, \ldots, x_m) = R_0 b_0(x_1, \ldots, x_m).$$

In addition, the key generation entity creates a second noise function $N_n(x_0, x_1, \ldots, x_m)$ from $b_n(x_1, \ldots, x_m)$, $x_0^{n+\lambda}$ and a second selected arbitrary number Rn:

$$N_n(x_0, x_1, \ldots, x_m) = R_n b_n(x_1, \ldots, x_m) x_0^{n+\lambda}$$

where $R_0$ and $R_n$ are not coprime with $\varphi(p)$. Here again, it is noted that, unlike $N_0$, $N_n$ is not just a function of $x_1, \ldots, x_m$ but also of $x_0$.

Step 660:

The key generation entity creates the signer's private key 540 by assembling the following data elements, which resemble those previously described with respect to Use Case 1:

A. $R_0$ and $R_n$

B. the coefficients of $f(\bullet)$ (i.e., $f_0, f_1, \ldots, f_\lambda$)

C. the coefficients of $h(\bullet)$ (i.e., $h_0, h_1, \ldots, h_\lambda$)

In addition, for Use Case 2, the signer's private key 540 includes the coefficients $E_{pi}$ and $E_{qi}$, $i=1, 2, \ldots, n+\lambda-1$, of two extra univariate polynomials:

$$E_p(x_0) = E_{p1} x_0 + E_{p2} x_0^2 + \ldots + E_{p\lambda} x_0^{n+\lambda-1} \quad \text{D.}$$

$$E_q(x_0) = E_{q1} x_0 + E_{q2} x_0^2 + \ldots + E_{q\lambda} x_0^{n+\lambda-1} \quad \text{E.}$$

The above data elements can be arbitrarily chosen from 0 to $\varphi(p)$ by the key generation entity.

Step 670:

The key generation entity creates the signer's public key 570 in a manner that is similar to way in which the recipient's public key 40 was derived in Use Case 1, with slight differences. Specifically, the signer's public key 570 includes the following data elements (the integer p can be part of the signer's public key 570 or can be a known system variable):

A. the coefficients of the first noise function $N_0(x_1, \ldots, x_m)$

B. the coefficients of the second noise function $N_n(x_0, x_1, \ldots, x_m)$

C. the set of coefficients $p'_i(x_1, \ldots, x_m) = R_0[p_i(x_1, \ldots, x_m) - E_{pi}]$ for $i=1, 2, \ldots, n+\lambda-1$, (with $p_i(x_1, \ldots, x_m)$ as defined in step 640)

D. the set of coefficients $q'_i(x_1, \ldots, x_m) = R_n[q_i(x_1, \ldots, x_m) - E_{pi}]$ for $i=1, 2, \ldots, n+\lambda-1$, (with $q_i(x_1, \ldots, x_m)$ as defined in step 640)

It is noted that each of the coefficients $p'_i(x_1, \ldots, x_m)$ and $q'_i(x_1, \ldots, x_m)$ will be even because $R_0$ and $R_n$ are even.

Step 680:

The key generation entity causes the signer's private key 540 to be securely stored in a memory of the signer's 510. The key generation entity also causes the signer's public key 570 to be made available to any destination desirous of carrying out a verification process (such as the verifier 550).

Signing of Digital Asset Using Private Key

Figure 7:
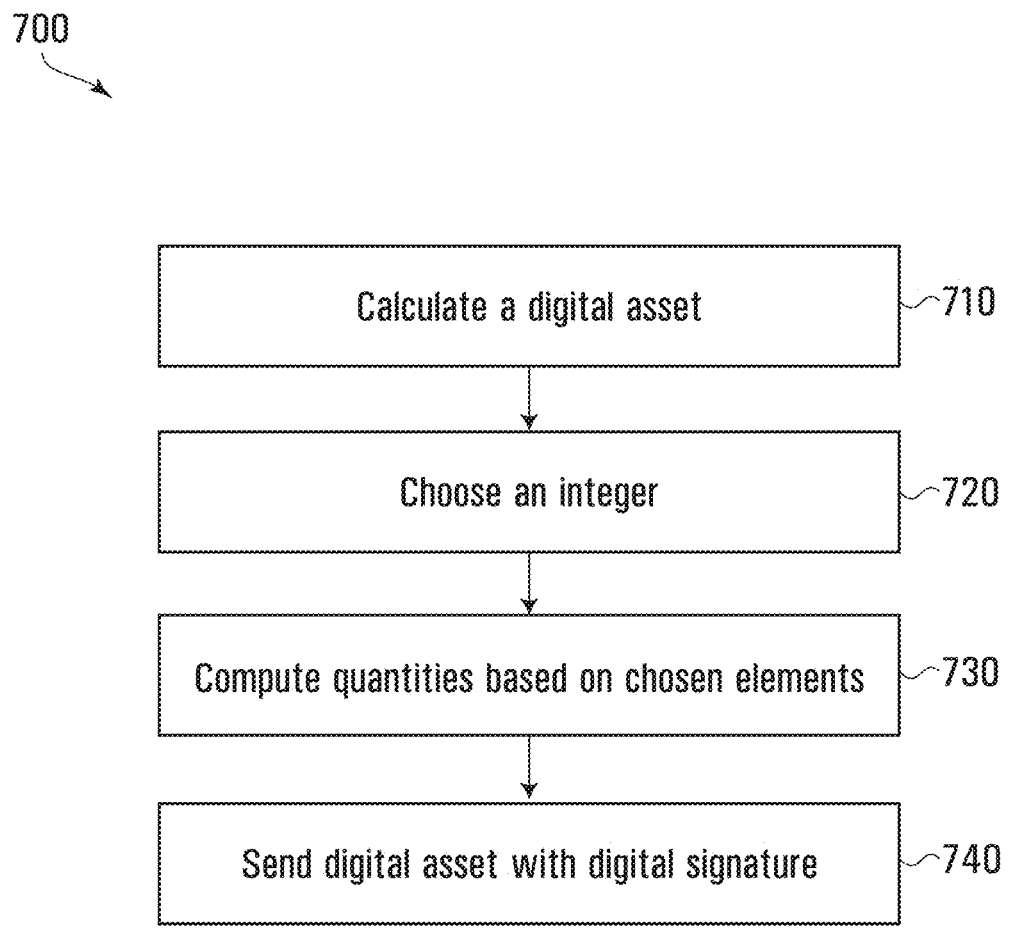
FIG. 7 is a flowchart showing steps in an example signing process, in accordance with a non-limiting embodiment.

Armed with the private key 540 as defined above, the signer 510 may perform a signing process 700 in accordance with a non-limiting embodiment, now described with reference to FIG. 7. The steps in the signing process 700 include various sub-steps, and not all steps or sub-steps need be performed in the order described.

Step 710:

The signer 510 derives a digital asset $x_0$ from a digital message (which can be a digital document, an online transaction, a public key for a certificate, etc.). This derivation can be carried out using a cryptographic hash algorithm, to name a non-limiting example.

Step 720:

The signer 510 chooses a secret base g for signing the digital asset. This can be any arbitrarily selected integer from $[2, 3, \ldots, p-1]$. It can in some cases be the output of a pseudo-random number generator. The base g is not revealed to the eventual verifier.

Step 730:

The signer 510 computes the following quantities, based on its knowledge of the private data elements chosen in steps 710-720 and on its knowledge of the data elements of the private key 540 (see steps 610-670):

$$A = g^{f(x_0)R_0 \mod \varphi(p)} \mod p$$

$$B = g^{h(x_0)R_n \mod \varphi(p)} \mod p$$

$$C = g^{s_0(x_0) \mod \varphi(p)} \mod p$$

$$D = g^{s_n(x_0) \mod \varphi(p)} \mod p$$

$$E = g^{t(x_0) \mod \varphi(p)} \mod p$$

where $$s_0(x_0) = R_n[h(x_0)f_0 - f(x_0)h_0]$$

$$s_n(x_0) = R_0[h(x_0)f_\lambda - f(x_0)h_\lambda]$$

$$t(x_0) = R_0 R_n[h(x_0)E_p(x_0) - f(x_0)E_q(x_0)]$$

Step 740:

The signer 510 sends the digital message together with the digital signature 530 which in this case comprises the quantities A, B, C, D and E (computed at step 730) to a recipient (in this case, to the verifier 550). This can be done over the data network 60 (e.g., the Internet), for example.

Verifying Provenance of a Received Signature Using Public Key

Figure 8:
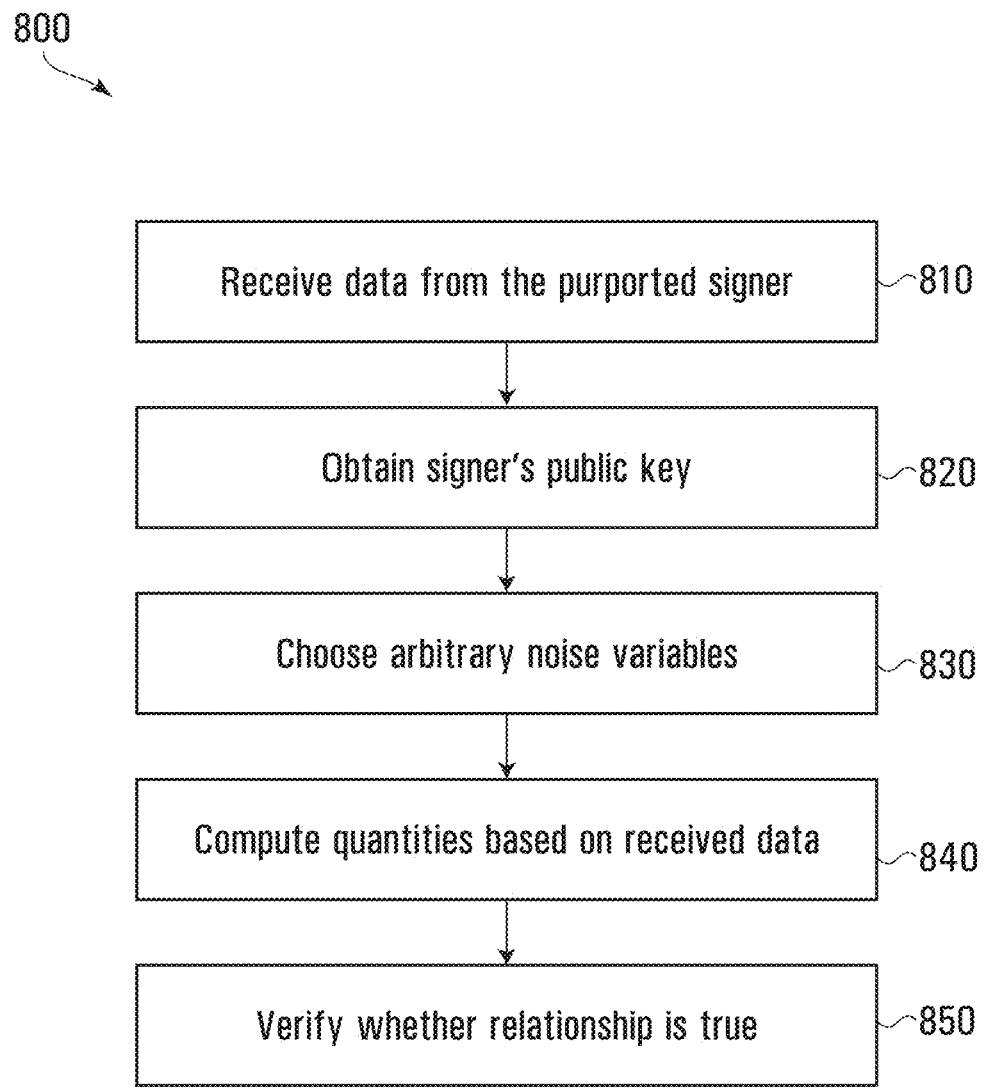
FIG. 8 is a flowchart showing steps in an example verification process, in accordance with a non-limiting embodiment.

Consider that the verifier 550 wishes to confirm that the digital asset $x_R$, which can be derived from the received message and, from the verifier's point of view is merely purported to come from the signer 510, does truly come from the signer 510. Accordingly, the verifier 550 may perform a verification process 800 in accordance with a non-limiting embodiment, now described with reference to FIG. 8. The steps in the verification process 800 include various sub-steps, and not all steps or sub-steps need be performed in the order described.

Step 810:

The verifier 550 receives a message purported to come from the signer 510, and which carries (either explicitly, as in FIG. 5A, or implicitly, as in FIG. 5B) the digital asset $x_0$, and the digital signature 530 containing data elements A, B, C, D and E. In the case of FIG. 5B, the digital asset can be derived from the received message $x_0$ using a cryptographic hash function, for example.

Step 820:

The verifier 550 obtains the public key 570 of the signer 510. It is recalled that the public key 570 includes:

the coefficients of the first and second noise functions $N_0(x_1, \ldots, x_m)$, $N_n(x_0, x_1, \ldots, x_m)$ the sets of coefficients $p'_i(x_1, \ldots, x_m)$ and $q'_i(x_1, \ldots, x_m)$, for $i=1, 2, \ldots, n+\lambda-1$ Step 830:

The verifier 550 chooses m arbitrary noise variables $x_1, \ldots, x_m$. In a non-limiting embodiment, these may be random numbers.

Step 840:

The verifier 550 computes the following quantities based on (i) the digital asset $x_0$ (derived from the digital message using a hash function); (ii) the noise variables $x_1, \ldots, x_m$; and (iii) the data elements of the signer's public key 570:

$$P' = \Sigma_{i=1}^{n+\lambda-1} p'_i(x_1, \ldots, x_m) x_0^j$$

$$Q' = \Sigma_{i=1}^{n+\lambda-1} q'_i(x_1, \ldots, x_m) x_0^j$$

$$N_0 = N_0(x_1, \ldots, x_m)$$

$$N_n = N_n(x_0, x_1, \ldots, x_m)$$

with the above calculations being mod $\varphi(p)$.

Step 850:

The verifier 550 verifies whether the following mathematical relationship is true (recalling that A, B, C, D and E are part of the received digital signature 530):

$$A^{Q'} = B^{P'} C^{N_0} D^{N_n} E \mod p$$

If the relationship is true, the verifier 550 concludes that the signer 510 is the true source of the message from which the digital asset $x_0$ was derived, otherwise, the verifier concludes that the message from which the digital asset $x_0$ was derived was not sent by the signer 510.

Equivalently, step 850 could involve comparing $A^{Q'} - B^{P'} C^{N_0} D^{N_n} E$ to zero.

The verification process 800 is thus complete. The outcome of the verification process 800 can be communicated via a graphical user interface, encoded in a signal sent over a data network or stored in a non-transitory memory.

It is noted that the conclusion reached at step 850 holds independently of the values of the noise variables $x_1, \ldots, x_m$, which allows the verifier to re-run the above steps 810-850 for an entirely different set of noise variables, in case of any doubt as to the provenance of the message from which the received digital asset $x_0$ was derived.

It should be appreciated that the values of m, n and p are predetermined and known to the signer 510 and the verifier 550 for the purposes of a given instantiation of the signing process 700 and the verification process 800.

Explanation of how it Works

Consideration is now given to explaining why it is the case that verification of the above mathematical relationship (step 850) serves as an authentication of provenance of the message from which digital asset $x_0$ was derived, irrespective of the values of the noise variables $x_1, \ldots, x_m$, despite the fact that the noise variables are chosen by the verifier 550 (and not the signer 510).

To this end, it is recalled that $P(x_0, x_1, \ldots, x_m)$ was defined as $B(x_0, x_1, \ldots, x_m)f(x_0)$ and $Q(x_0, x_1, \ldots, x_m)$ was defined as $B(x_0, x_1, \ldots, x_m)h(x_0)$. Therefore, from a mathematical standpoint:

$$\frac{P(x_0, x_1, \ldots, x_m)}{Q(x_0, x_1, \ldots, x_m)} = \frac{f(x_0)}{h(x_0)}$$

This leads to:

$$R_0 R_n f(x_0) Q(x_0, x_1, \ldots, x_m) = R_0 R_n h(x_0) P(x_0, x_1, \ldots, x_m).$$ [Equation (1)]

Now, since $P' = \Sigma_{i=1}^{n+\lambda-1} p'_i(x_1, \ldots, x_m) x_0^j$ and since $p'_i(x_1, \ldots, x_m) = R_0[p_i(x_1, \ldots, x_m) - E_{pi}]$, this means that $R_0 R_n h(x_0) P(x_0, x_1, \ldots, x_m)$ can be rewritten as:

$$R_0 R_n h(x_0) P(x_0, x_1, \ldots, x_m) = R_n h(x_0)(R_0 P(x_0, x_1, \ldots, x_m))$$

$$= R_n h(x_0)(R_0[P(x_0, x_1, \ldots, x_m) - E_{pi} + E_{pi}])$$

Recognizing that $$P(x_0, x_1, \ldots, x_m) = \frac{N_0}{R_0} f_0 + p_i(x_1, \ldots, x_m) + \frac{N_n}{R_n} f_\lambda,$$

this continues as:

$$= R_n h(x_0) \left[ R_0 \left( p_i(x_1, \ldots, x_m) - E_{pi} + E_{pi} + \frac{N_0}{R_0} f_0 + \frac{N_n}{R_n} f_\lambda \right) \right]$$

$$= R_n h(x_0) \left[ R_0(p_i(x_1, \ldots, x_m) - E_{pi}) + R_0 \left( E_{pi} + \frac{N_0}{R_0} f_0 + \frac{N_n}{R_n} f_\lambda \right) \right]$$

$$= R_n h(x_0) \left[ P' + R_0 \left( E_{pi} + \frac{N_0}{R_0} f_0 + \frac{N_n}{R_n} f_\lambda \right) \right]$$

$$= R_n h(x_0) P' + R_0 R_n h(x_0) \left( E_{pi} + \frac{N_0}{R_0} f_0 + \frac{N_n}{R_n} f_\lambda \right)$$

$$= R_n h(x_0) P' + R_0 R_n h(x_0) E_{pi} + R_n h(x_0) N_0 f_0 + R_0 h(x_0) N_n f_\lambda.$$

Similarly, since $Q' = \Sigma_{i=1}^{n+\lambda-1} q'_i(x_1, \ldots, x_m) x_0^j$, since $q'_i(x_1, \ldots, x_m) = R_n[q_i(x_1, \ldots, x_m) - E_{qi}]$, $P(x_0, x_1, \ldots, x_m)$, this means that $R_0 R_n f(x_0) Q(x_0, x_1, \ldots, x_m)$ can be rewritten as:

$$R_0 R_n f(x_0) Q(x_0, x_1, \ldots, x_m) = R_0 f(x_0) Q' + R_0 R_n f(x_0) E_{qi} + R_0 f(x_0) N_n f_0 + R_n f(x_0) N_n f_\lambda.$$

Therefore, Equation (1) can be rewritten as:

$$R_0 f(x_0) Q' + R_0 R_n f(x_0) E_{qi} + R_0 f(x_0) N_n f_0 + R_n f(x_0) N_n f_\lambda = R_n h(x_0) P' + R_0 R_n h(x_0) E_{pi} + R_n h(x_0) N_0 f_0 + R_0 h(x_0) N_n f_\lambda$$ [Equation (2)]

This can be reorganized it into:

$$f(x_0) R_0 Q' = h(x_0) R_n P' + s_0(x_0) N_0 + s_n(x_0) N_n + t(x_0)$$ [Equation (3)]

where:

$$s_0(x_0) = R_n[h(x_0) f_0 - f(x_0) h_0]$$

$$s_n(x_0) = R_0[h(x_0) f_\lambda - f(x_0) h_\lambda]$$

$$t(x_0) = R_0 R_n[h(x_0) E_p(x_0) - f(x_0) E_q(x_0)]$$

Using modular exponentiation with base g (which, it is recalled, can be arbitrarily selected by the signer) over the Galois Field GF(p) or ring of integers: [2, 3, ..., p–1]:

$$g^{f(X_0) R_0 Q' \bmod \varphi(p)} = g^{[h(X_0) R_n P' + s_0(x_0) N_0 + s_n(x_0) N_n + t(x_0)] \bmod \varphi(p)} \bmod p$$

or:

$$A^{Q' \bmod \varphi(p)} = B^{P' \bmod \varphi(p)} C^{N_0 \bmod \varphi(p)} D^{N_n \bmod \varphi(p)} E \bmod p$$ [Equation (4)]

where $$A = g^{f(X_0) R_0 \bmod \varphi(p)} \bmod p,$$

$$B = g^{h(X_0) R_n \bmod \varphi(p)} \bmod p.$$

$$C = g^{s_0(x_0) \bmod \varphi(p)} \bmod p.$$

$$D = g^{s_n(x_0) \bmod \varphi(p)} \bmod p.$$

$$E = g^{t(x_0) \bmod \varphi(p)} \bmod p.$$

Or, we can simply rewrite Equation (4) as:

$$A^{Q'} = B^{P'} C^{N_0} D^{N_n} E$$ [Equation (5)]

Equation (5) can be used by the verifier 550 (which receives the public key 570 comprising the coefficients necessary to calculate P', Q', $N_0$ and $N_n$) to verify whether the digital asset $x_0$ was indeed signed by the signer 510.

It is noted that the elements of the digital signature A, B, C, D, E are only related to (i) the base g chosen arbitrarily by the signer 510, (ii) the digital asset $x_0$ and (iii) data elements $f(x_0)$ and $h(x_0)$ of the private key. It is noted that the digital signature does not depend on the noise variables $x_1, \ldots, x_m$. In other words, if the correct private key 540 was used to create the digital signature A, B, C, D, E for the digital asset $x_0$, then Equation (5) will hold for all sets of noise variables $x_1, \ldots, x_m$ that could be chosen by the verifier 550. On the other hand, Equation (5) will not hold if the incorrect private key was used to generate the digital signature.

Security Analysis for Use Case 2

The complexity of obtaining the private key 540 from the public key 570 is as follows:

$$O(\varphi(p)^{n+1} + 2^{x+1}) = O(q^{n+1} 2^{x(n+1)} + 2^{x+1})$$

where $p = 2^x q + 1$, and where q is a prime number, and x is an integer denting a number of bits. In some embodiments x can have a value of 6, 8, 10, 12, 14, 16 or more, and p can have a value at least as great as $2^6$, $2^8$, $2^{10}$, $2^{12}$, $2^{14}$, $2^{16}$, $2^{18}$, $2^{20}$, $2^{22}$, $2^{24}$ or even more.

The complexity of obtaining the private key 540 from the signature 530 is as follows:

$$O(q\ 2^{x(n+1)+1})$$

The complexity of spoofing is as follows:

$O((\varphi(p))^{5+m}) = O(q^{5+m} 2^{x(5+m)})$ with m to be the number of noise terms and m>=1.

Therefore, the overall complexity of Use Case 2 is the lowest among the above, namely $O(q\ 2^{x(n+1)+1}) = O(2^{\log q + x(n+1)+1})$.

Turning now to the issue of the size of the public key and the private key in Use Case 2 (in terms of the number of data elements over GF(p)), the following will be noticed:

- The size of the public key (see step 670)=m[2(n+λ-1)+2]=2m(n+λ), which is the same as for the public key in Use Case 1;
- The size of the private key (see step 660)=2λ+2+2(n+λ-1)=2(n+2λ).
- The size of the digital signature is 5*K with K to be the size of required security (for example, 16 bytes for level I, 24 bytes for level III and 32 bytes for level V).

By way of specific example, the following shows the size of the public key, private key and digital signature for various numbers of noise variables (i.e., m=2 and m=3) and various orders of the multivariate base polynomial (i.e., n=2, n=4 and n=6), based on the formulas in the aforementioned table, while A is kept equal to 2:

| (n, λ, x, log q)<br>Complexity $O(2^{\log q + x(n+1)+1})$ | (2, 2, 32, 32)<br>$O(2^{129})$:<br>Security level "I" | (4, 2, 32, 32)<br>$O(2^{193})$:<br>Security level "III" | (6, 2, 32, 32)<br>$O(2^{257})$:<br>Security level "V" | (2, 2, 64, 64)<br>$O(2^{257})$:<br>Security level "V" |
|---|---|---|---|---|
| Size of public key for m = 2 (bytes) | 16 * 8 = 128 | 24 * 8 = 192 | 32 * 8 = 256 | 16 * 16 = 256 |
| Size of public key for m = 3 (bytes) | 24 * 8 = 192 | 36 * 8 = 288 | 48 * 8 = 384 | 24 * 16 = 284 |
| Size of private key (bytes) | 12 * 8 = 96 | 16 * 8 = 128 | 20 * 8 = 160 | 12 * 16 = 192 |
| Signature Size (bytes) | 80 | 120 | 160 | 160 |

Use Case 3: Zero-Knowledge Proof (ZKP)

Figure 9:
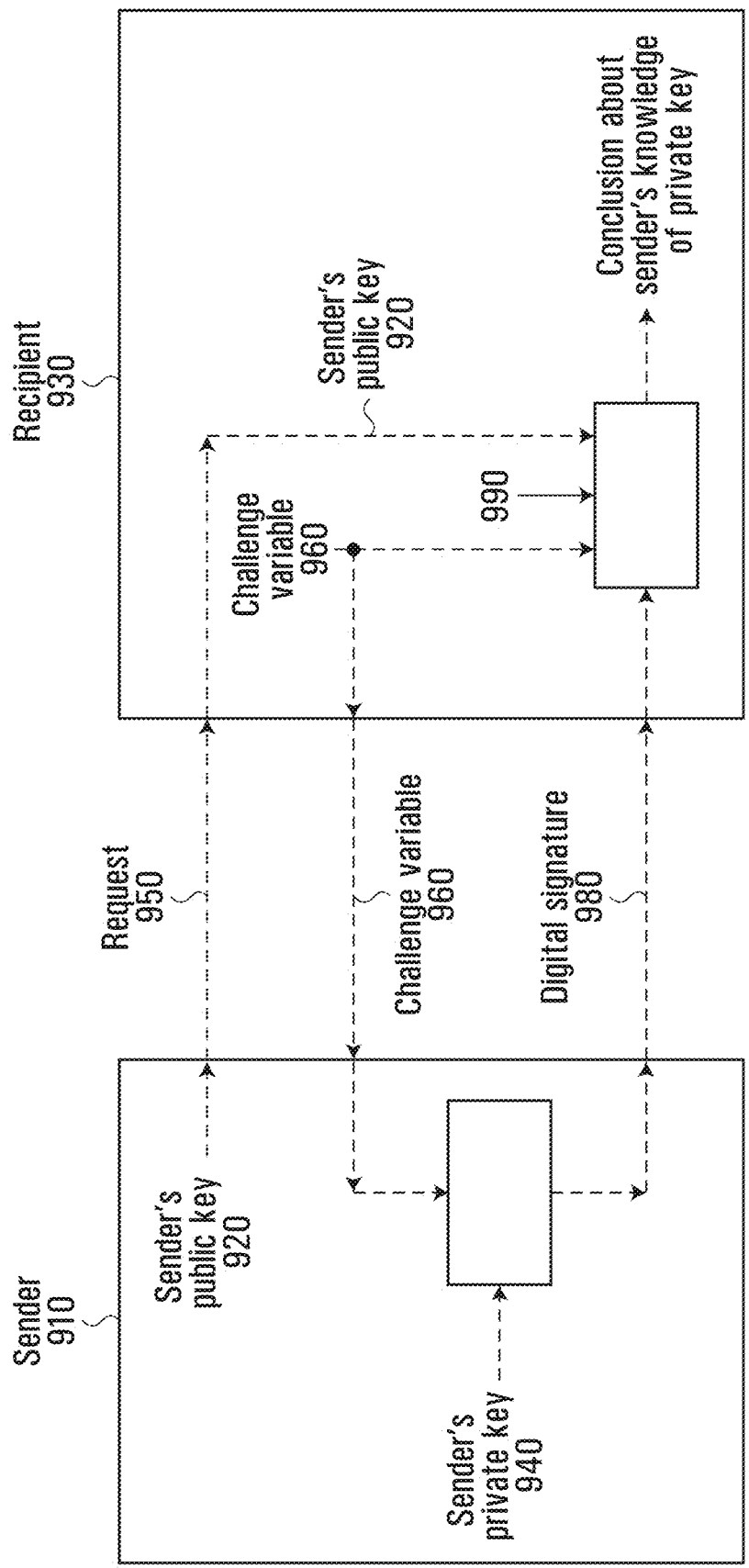
FIG. 9 is a signal flow diagram illustrating a digital signature process, in accordance with a non-limiting embodiment.

In this use case, now described with reference to FIG. 9, a sender (or prover) 910 associated with a public key 920 of a public/private key pair wishes to prove to a recipient (or verifier) 930 that it has knowledge of the associated private key 940. The private key 940 can represent an identity, for example. If the public key 920 and the private key 940 are designed as described above for Use Case 2, a single-iteration ZKP scheme can be used.

In particular, the sender 910 sends to the recipient 930 a request 950 including the sender's public key 920 (public key can be pre-known by the recipient). The recipient 930 generates a challenge variable 960 and sends the challenge variable 960 to the sender 910. In response, the sender 910 generates a digital signature 970 from the challenge variable 960 and the private key 940, resulting in a digital signature 980 to be returned to the recipient as a response of the challenge.

The recipient 930 then evaluates two mathematical expressions based on (i) the challenge variable 960, (ii) the public key 920 that was received from the sender 910 and (iii) a set of "noise variables" 990. Such noise variables 990 are selected by the recipient 930 at its discretion and without involving the sender 910. The recipient 930 then checks whether the two quantities on both sides of verification equation are identical. If so, the recipient 930 concludes, with a fairly high degree of certainty, that the sender 910 has knowledge of the private key 940, otherwise, the recipient 930 concludes that the sender 910 does not have knowledge of the private key 940.

To increase the degree of certainty, the recipient 930 can select a new set of noise variables and can again compute the two quantities to see if they are identical. This can be done on the recipient's end as many times as desired, for as many sets of noise variables as required, and without additional interaction with the sender 910.

Mathematically, Use Case 3 is the same as Use Case 2, but from an application standpoint, the role of $x_0$ is different. Specifically, it is recalled that for Use Case 2 (digital signature), $x_0$ is a digital asset to be signed and either explicitly (FIG. 5A) or implicitly (FIG. 5B) accompanies the signature (A, B, C, D, E) sent from the signer 510 to the verifier 550. In Use Case 3 (zero-knowledge proof, see FIG. 9), $x_0$ represents a challenge variable sent from the recipient 930 to the sender 910, in response to which sender 910 sends the signature (A, B, C, D, E) to the recipient 930 in order to demonstrate that the sender 910 has knowledge of the private key 940. It is noted that the challenge-response need occur only once, and that to increase the degree of confidence that the sender 910 has knowledge of the private key 940, the recipient 930 need simply change the noise variables and re-run the computation (without further challenging or involving the sender 910).

As such, the ZKP scheme described above may provide a quantum-safe authentication protocol that usable for a wide range of applications including identity authentication in the absence of a trusted third party.

Figure 11:
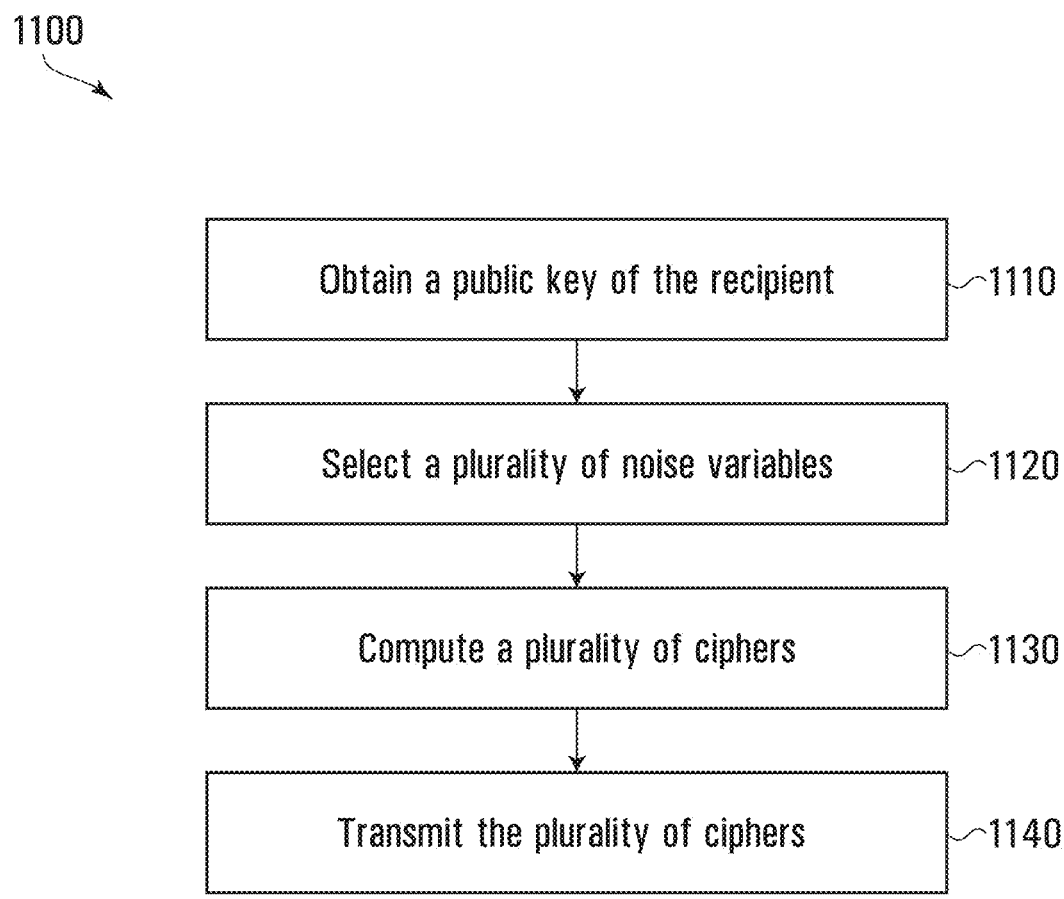
FIG. 11 is a flowchart showing steps in an example method of operating a sender computing apparatus to securely transmit a digital asset to a recipient over a data network in accordance with a non-limiting embodiment.

Accordingly, and with reference to FIG. 11, there has been provided a method 1100 of operating a sender computing apparatus to securely transmit a selected digital asset to a recipient over a data network. As shown at step 1110, the method includes obtaining a public key of the recipient corresponding to a private key of the recipient. As shown at step 1120, the method includes selecting a plurality of noise variables. As shown at step 1130, the method includes computing a plurality of different ciphers from (i) the selected digital asset, (ii) the noise variables and (iii) the public key of the recipient. As shown at step 1140, the method includes transmitting the plurality of ciphers to the recipient over the data network. Of note is the fact that the digital asset is derivable by carrying out a predefined computation involving the plurality of ciphers and the recipient's private key.

Figure 12:
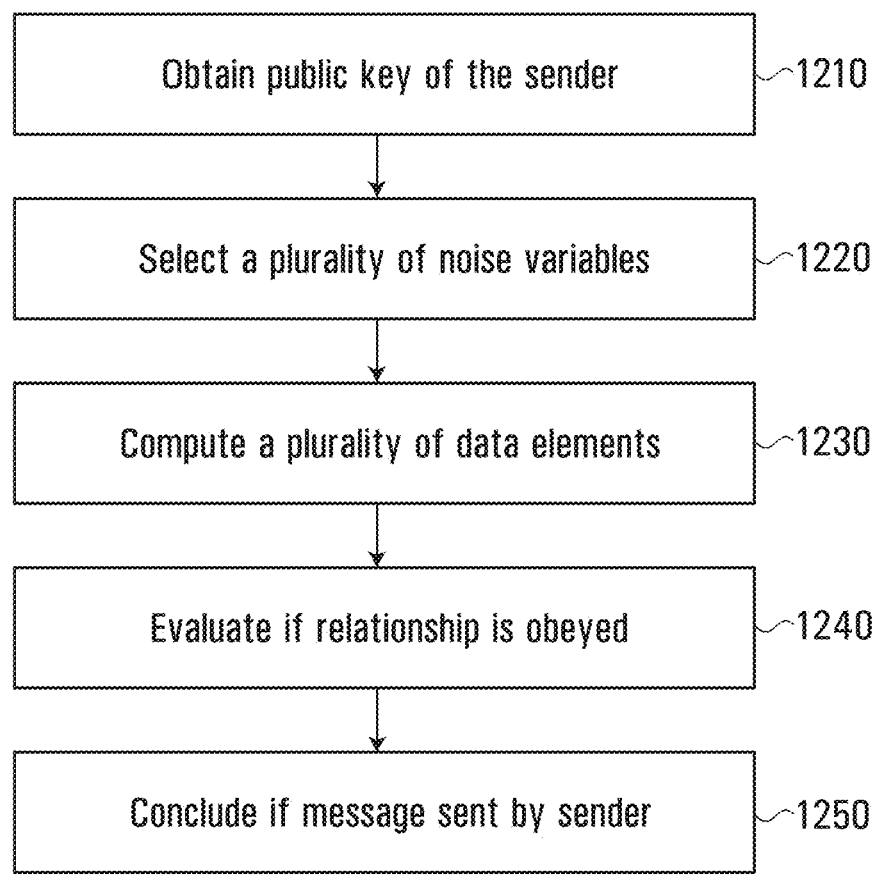
FIG. 12 is a flowchart showing steps in an example method of operating a computing apparatus to authenticate a received message purportedly sent by a given sender in accordance with a non-limiting embodiment.

Also, and with reference to FIG. 12, there has been provided a method 1200 of operating a computing apparatus to authenticate a received message purportedly sent by a given sender, the message comprising a digital asset and a digital signature, the digital signature comprising a plurality of data elements. As shown at step 1210, the method includes obtaining a public key of the given sender. As shown at step 1220, the method includes selecting a plurality of noise variables. As shown at step 1230, the method includes computing a plurality of data elements based on the digital asset, the noise variables and the public key of the purported sender. As shown at step 1240, the method includes evaluating whether the computed data elements and the data elements of the digital signature obey a predetermined relationship. As shown at step 1250, in case the predetermined relationship is obeyed, the method includes concluding that the message was sent by the given sender, otherwise, concluding that the message was not sent by the given sender.

Figure 13:
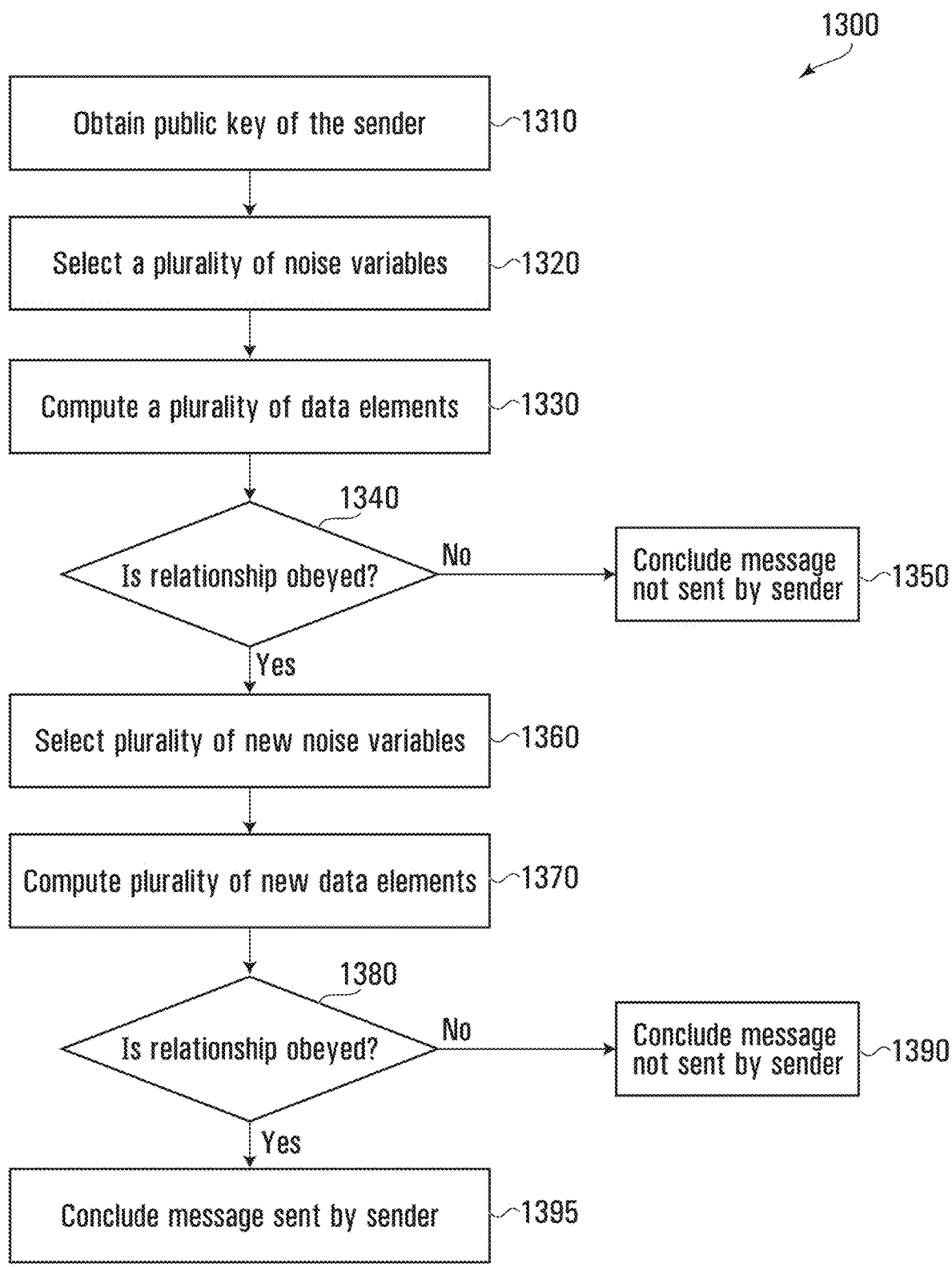
FIG. 13 is a flowchart showing steps in an example method of operating a computing apparatus to authenticate a received message purportedly sent by a given sender, in accordance with a non-limiting embodiment.

Also, and with reference to FIG. 13, there has been provided a method 1300 of operating a computing apparatus to authenticate a received message purportedly sent by a given sender, the message comprising a digital asset and a digital signature, the digital signature comprising a plurality of data elements. As shown at step 1310, the method includes obtaining a public key of the given sender. As shown at step 1320, the method includes selecting a plurality of noise variables. As shown at step 1330, the method includes computing a plurality of data elements based on the digital asset, the noise variables and the public key of the purported sender. As shown at step 1340, the method includes evaluating whether the computed data elements and the data elements of the signature obey a predetermined relationship. As shown at step 1350, in case the predetermined relationship is not obeyed, concluding that the message was not sent by the given sender. As shown at step 1360, in case the predetermined relationship is obeyed the method includes selecting a plurality of new noise variables. As shown at step 1370, the method includes computing a plurality of new data elements based on the digital asset, the new noise variables and the public key of the purported sender. As shown at step 1380, the method includes evaluating whether the computed new data elements and the data elements of the signature obey the predetermined relationship. As shown at step 1390, in the case the predetermined relationship is not obeyed, concluding that the message was not sent by the given sender. As shown at step 1395, in the case the predetermined relationship is obeyed, concluding that the message was sent by the given sender.

Figure 14:
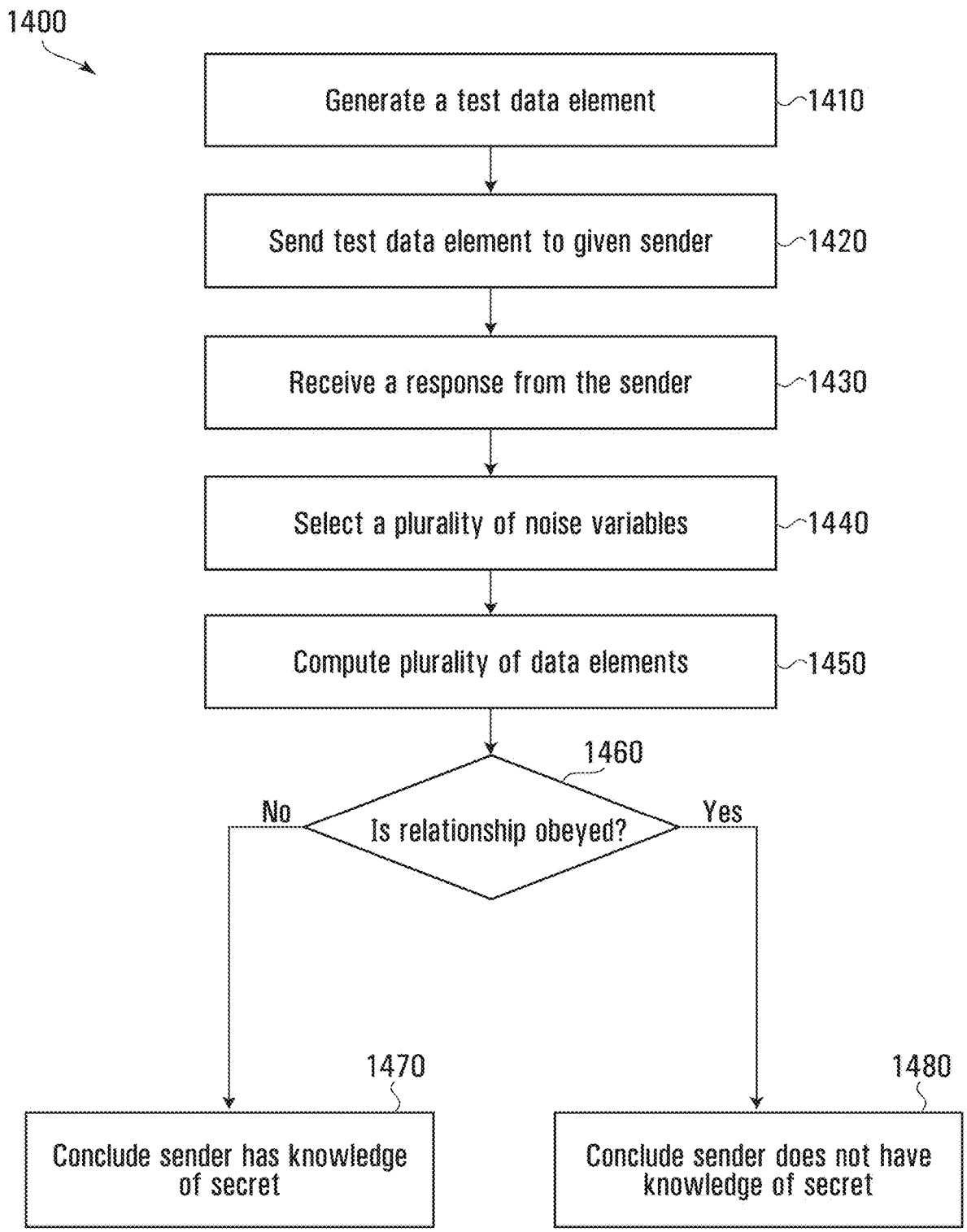
FIG. 14 is a flowchart showing steps in an example method of operating a computing apparatus to verify that a given sender has knowledge of a secret, in accordance with a non-limiting embodiment.

Also, and with reference to FIG. 14, there has been provided a method 1400 of operating a computing apparatus to verify that a given sender has knowledge of a secret, the given sender being associated with a public key. As shown at step 1410, the method includes generating a test data element. As shown at step 1420, the method includes sending the test data element to the given sender. As shown at step 1430, the method includes receiving a response from the sender, the response comprising a digital signature. As shown at step 1440, the method includes selecting a plurality of noise variables. As shown at step 1450, the method includes computing a plurality of data elements based on the test data element, the noise variables and the public key of the given sender. As shown at step 1460, the method includes evaluating whether the computed data elements and the data elements of the digital signature obey a predetermined relationship. As shown at step 1470, in the case the predetermined relationship is obeyed, concluding that the given sender has knowledge of the secret, otherwise, as shown at step 1480, concluding that the given sender does not have knowledge of the secret.

Figure 15:
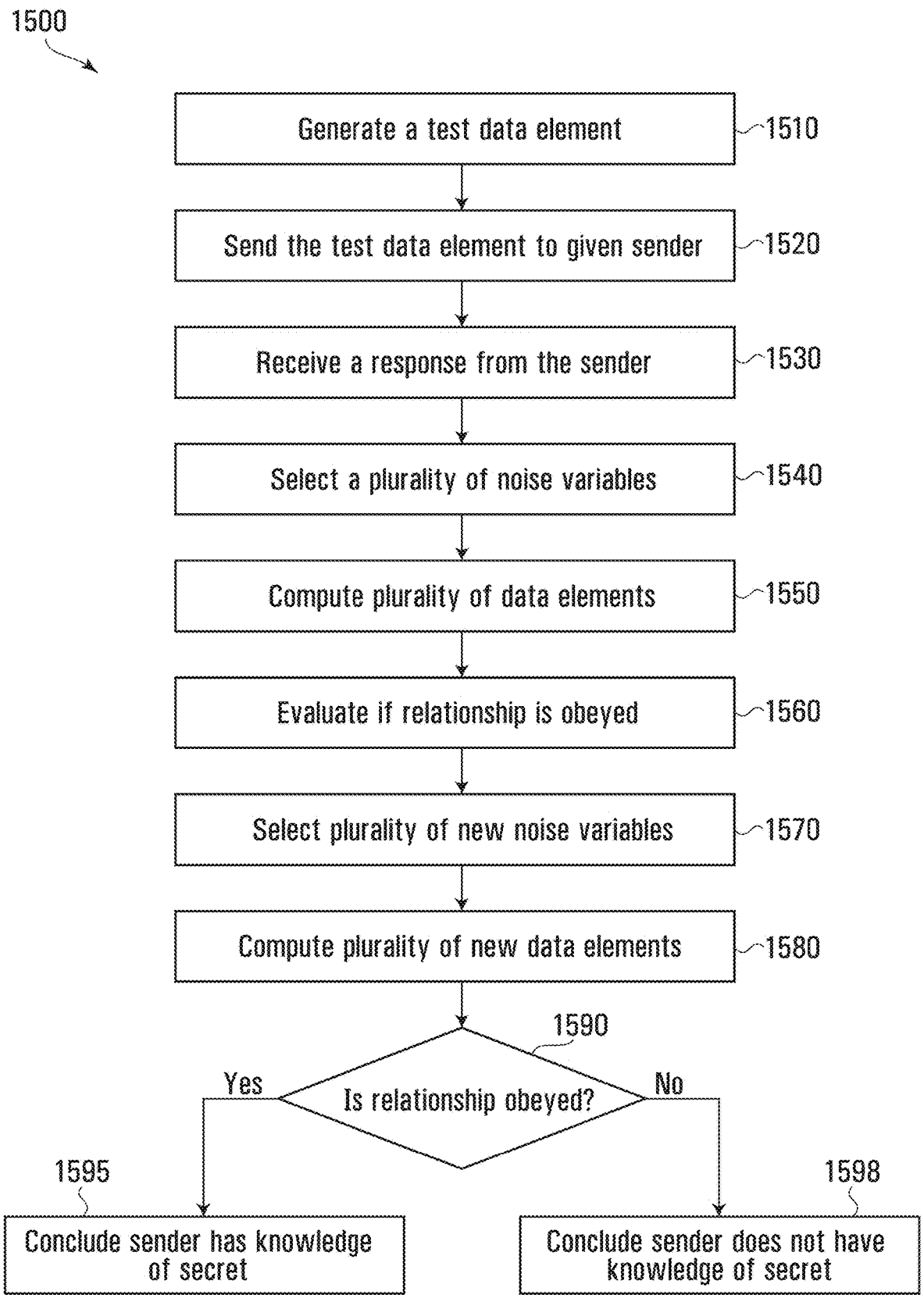
FIG. 15 is a flowchart showing steps in an additional embodiment of an example method of operating a computing apparatus to verify that a given sender has knowledge of a secret, in accordance with a non-limiting embodiment.

Also, and with reference to FIG. 15, there has been provided a method 1500 of operating a computing apparatus to verify that a given sender has knowledge of a secret, the given sender being associated with a public key. As shown at step 1510, the method includes generating a test data element. As shown at step 1520, the method includes sending the test data element to the given sender. As shown at step 1530, the method includes receiving a response from the sender, the response comprising a digital signature. As shown at step 1540, the method includes selecting a plurality of noise variables. As shown at step 1550, the method includes computing a plurality of data elements based on the test data element, the noise variables and the public key of the given sender. As shown at step 1560, the method includes evaluating whether the computed data elements and the data elements of the digital signature obey a predetermined relationship. As shown at step 1570, in the case the predetermined relationship is obeyed the method includes selecting a plurality of new noise variables. As shown at step 1580, the method includes computing a plurality of new data elements based on the test data element, the new noise variables and the public key of the given sender. As shown at step 1590, the method includes evaluating whether the computed new data elements and the data elements of the digital signature obey the predetermined relationship. As shown at step 1595, the method includes in case the predetermined relationship is obeyed, concluding that the given sender has knowledge of the secret, otherwise, as shown in step 1598, concluding that the given sender does not have knowledge of the secret.

The entities referred to above as "sender", "encryptor", "recipient", "signer", "verifier", "destination", "key generation entity" and the like, which carry out the various encryption, decryption, signature, verification and ZKP methods and protocols described above, can be realized by computing apparatuses executing computer-readable program instructions stored on non-transitory computer-readable media. Such computing apparatuses could be any of a smartphone, laptop, desktop computer, tablet, mainframe, vehicle ECU or IoT (Internet-of-Things) device, to name a few non-limiting possibilities.

Figure 10:
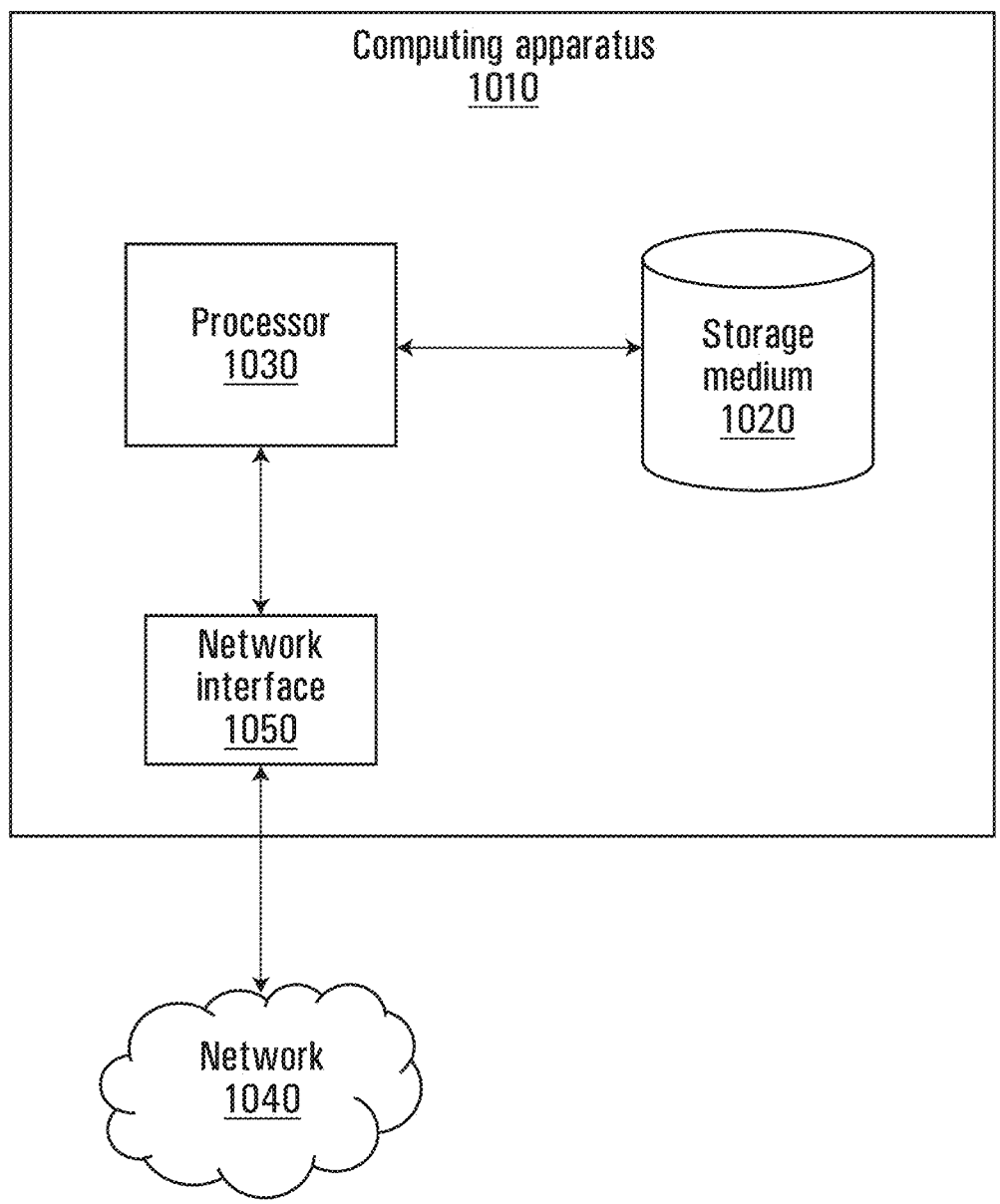
FIG. 10 is a block diagram illustrating various elements of a computing apparatus, in accordance with a non-limiting embodiment.

With reference to FIG. 10, various elements of a suitable computing apparatus are now described. The computing apparatus 1010 includes a computer-readable storage medium 1020, which can be a tangible device capable of storing program instructions for use by a processor 1030. The computer-readable storage medium 1020 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium 1020 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The program instructions can be downloaded to the computer-readable storage medium 1020 from an external computer or external storage device via a network 1040, for example, the Internet, a local area network, a wide area network and/or a wireless network. The network 1040 may comprise copper transmission cables, optical transmission fibers, wireless transmission, routers, firewalls, switches, gateway computers and/or edge servers. A network adapter card or network interface 1050 in the computing apparatus 1010 receives program instructions over the network 1040 and forwards them to the computer-readable storage medium 1020 for storage and execution by the processor 1030. Execution of the program instructions by the processor 1030 results in the computing apparatus 1010 carrying out aspects of the present disclosure.

The program instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the program instructions by utilizing state information to personalize the electronic circuitry, in order to carry out aspects of the present disclosure.

Aspects of the present disclosure are described herein with reference to flowcharts and block diagrams of methods and apparatus (systems), according to various embodiments. It will be understood that each block of the flowcharts and block diagrams, and combinations of such blocks, can be implemented by execution of the program instructions. Namely, the program instructions, which are read and processed by the processor 1030 of the computing apparatus 1010, direct the processor 1030 to implement the functions/acts specified in the flowchart and/or block diagram block or blocks. It will also be noted that each block of the flowcharts and/or block diagrams, and combinations of such blocks, can also be implemented by special purpose hardware-based systems that perform the specified functions or acts or carry out combinations of special purpose hardware and computer instructions.

The flowcharts and block diagrams illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be appreciated that throughout the specification, discussions utilizing terms such as "processing", "computing", "calculating", "determining", "analyzing" or the like, can refer to the action and/or processes of a computer or computing system, or similar electronic computing device, that manipulate and/or transform data represented as physical, such as electronic, quantities into other data similarly represented as physical quantities.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features may be described only in the context of one embodiment. The particular choice for description herein with regard to a single embodiment is not to be taken as a limitation that the particular feature is only applicable to the embodiment in which it is described. Various features described in the context of one embodiment described herein may be equally applicable to, additive, or interchangeable with other embodiments described herein, and in various combinations, groupings or arrangements. In particular, use of a single reference numeral herein to illustrate, define, or describe a particular feature does not mean that the feature cannot be associated or equated to another feature in another drawing figure or description.

Also, when the phrase "at least one of A and B" is used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. A method of operating a computing apparatus to confirm provenance of a received message purportedly sent by a given sender, the message comprising a digital signature, the digital signature comprising a plurality of data elements, the method comprising:
    obtaining a digital asset from the message;
    obtaining a public cryptographic key of the given sender;
    selecting a plurality of noise variables;
    computing a plurality of data elements based on the digital asset, the noise variables and the public cryptographic key of the given sender;
    evaluating whether the computed data elements and the data elements of the digital signature obey a predetermined relationship, the predetermined relationship being that $A^Q$ is equal to a product of $B^P$, $C^{N_o}$, $D^{N_n}$ and E, wherein A, B, C, D and E represent the data elements of the digital signature and wherein Q', P', $N_0$ and $N_n$ represent parts of the public cryptographic key;

in case the computed data elements and the data elements of the digital signature obey the predetermined relationship, generating a signal indicative of the message having been sent by the given sender, otherwise, generating a signal indicative of the message not having been sent by the given sender.

2. The method defined in claim 1, wherein obtaining the digital asset from the message comprises carrying out a cryptographic hash function.

3. The method defined in claim 1, wherein computing the plurality of data elements comprises:
   computing a first data element as a first noise function of the noise variables, the first noise function defined by a first set of noise function coefficients comprising a first part of the public cryptographic key;
   computing a second data element as a second noise function of the noise variables and of the digital asset, the second noise function defined by a second set of noise function coefficients comprising a second part of the public cryptographic key;
   computing a third data element as a third function of the digital asset, the third function defined by a third set of coefficients derived from (i) the noise variables; and (ii) a third part of the public cryptographic key; and
   computing a fourth data element as a fourth function of the digital asset, the fourth function defined by a fourth set of coefficients derived from (i) the noise variables; and (ii) a fourth part of the public cryptographic key.

4. The method defined in claim 3, wherein the first noise function is a first multivariate polynomial function and wherein the first set of noise function coefficients are coefficients of the first multivariate polynomial function.

5. The method defined in claim 4, wherein the second noise function is a second multivariate polynomial function and wherein the second set of noise function coefficients are coefficients of the second multivariate polynomial function.

6. The method defined in claim 5, wherein the third function is a third polynomial function and wherein the coefficients in the third set of coefficients are defined by respective polynomial functions of the noise variables, coefficients of the respective polynomial functions comprising the third part of the public cryptographic key.

7. The method defined in claim 6, wherein each of the respective polynomial functions of the noise variables is a multivariate polynomial function of the noise variables.

8. The method defined in claim 6, wherein the fourth function is a fourth polynomial function and wherein the coefficients in the fourth set of coefficients are defined by additional respective polynomial functions of the noise variables, coefficients of the additional respective polynomial functions comprising the fourth part of the public cryptographic key.

9. The method defined in claim 8, wherein each of the additional respective polynomial functions of the noise variables is a multivariate polynomial function of the noise variables.

10. The method defined in claim 8, wherein the coefficients of a given one of the respective polynomial functions are the coefficients of the terms resulting from cross-multiplication of a base polynomial and a first polynomial, and wherein the coefficients of a given one of the additional respective polynomial functions are the coefficients of the terms resulting from cross-multiplication of said base polynomial and a second polynomial.

11. The method defined in claim 10, wherein the first and second polynomials are of order greater than one.

12. The method defined in claim 1, further comprising outputting the signal via a graphical user interface or encoding the signal in a non-transitory storage medium.

13. The method defined in claim 1, wherein selecting the plurality of noise variables comprises obtaining the noise variables from a pseudo-random number generator.

14. The method defined in claim 1, wherein the computed data elements and the data elements of the digital signature obey the predetermined relationship when the data elements of the digital signature are derived from (i) the digital asset, (ii) a base data element and (iii) a private cryptographic key corresponding to the public key of the given sender.

15. The method defined in claim 1, wherein the predetermined relationship is obeyed by the computed data elements and the data elements of the digital signature when the data elements of the digital signature include:
   a first signature data element obtained by (i) computing a first quantity from the digital asset and a private cryptographic key corresponding to the public cryptographic key; and (ii) setting the first signature data element to equal a chosen base data element to the power of said first quantity;
   a second signature data element obtained by (i) computing a second quantity from the digital asset and the private cryptographic key; and (ii) setting the second signature data element to equal the base data element to the power of said second quantity;
   a third signature data element obtained by (i) computing a third quantity from the digital asset and the private cryptographic key; and (ii) setting the third signature data element to equal the base data element to the power of said third quantity;
   a fourth signature data element obtained by (i) computing a fourth quantity from the digital asset and the private cryptographic key; and (ii) setting the fourth signature data element to equal the base data element to the power of said fourth quantity; and
   a fifth signature data element obtained by (i) computing a fifth quantity from the digital asset and the private cryptographic key; and (ii) setting the fifth signature data element to equal the base data element to the power of said fifth quantity.

16. A non-transitory computer-readable storage medium comprising computer-readable instructions which, when executed by a processing entity of a computing apparatus, cause the computing apparatus to carry out operations to confirm provenance a received message purportedly sent by a given sender, the message comprising a digital asset and a digital signature, the digital signature comprising a plurality of data elements, the operations including:
   obtaining a digital asset from the message;
   obtaining a public cryptographic key of the given sender;
   selecting a plurality of noise variables;
   computing a plurality of data elements based on the digital asset, the noise variables and the public cryptographic key of the given sender;
   evaluating whether the computed data elements and the data elements of the digital signature obey a predetermined relationship, the predetermined relationship being that $A^{Q'}$ is equal to the product of $B^{P'}$, $C^{N_0}$, $D^{N_n}$ and E, wherein A, B, C, D and E represent the data elements of the digital signature and wherein Q', P', $N_0$ and $N_n$ represent parts of the public cryptographic key;
   in case the computed data elements and the data elements of the digital signature obey the predetermined relationship, generating a signal indicative of the message having been sent by the given sender, otherwise, generating a signal indicative of the message not having been sent by the given sender.

17. The non-transitory computer-readable storage medium defined in claim 16, wherein obtaining the digital asset from the message comprises carrying out a cryptographic hash function.

18. The non-transitory computer-readable storage medium defined in claim 16, wherein computing the plurality of data elements comprises:
    computing a first data element as a first noise function of the noise variables, the first noise function defined by a first set of noise function coefficients comprising a first part of the public cryptographic key;
    computing a second data element as a second noise function of the noise variables and of the digital asset, the second noise function defined by a second set of noise function coefficients comprising a second part of the public cryptographic key;
    computing a third data element as a third function of the digital asset, the third function defined by a third set of coefficients derived from (i) the noise variables; and (ii) a third part of the public cryptographic key; and
    computing a fourth data element as a fourth function of the digital asset, the fourth function defined by a fourth set of coefficients derived from (i) the noise variables; and (ii) a fourth part of the public cryptographic key.

19. The non-transitory computer-readable storage medium defined in claim 16, the operations further comprising outputting the signal via a graphical user interface or encoding the signal in a non-transitory storage medium.

20. The non-transitory computer-readable storage medium defined in claim 16, wherein selecting the plurality of noise variables comprises obtaining the noise variables from a pseudo-random number generator.

21. The non-transitory computer-readable storage medium defined in claim 16, wherein the computed data elements and the data elements of the digital signature obey the predetermined relationship when the data elements of the digital signature are derived from (i) the digital asset, (ii) a base data element and (iii) a private cryptographic key corresponding to the public key of the given sender.

22. The non-transitory computer-readable storage medium defined in claim 16, wherein the predetermined relationship is obeyed by the computed data elements and the data elements of the digital signature when the data elements of the digital signature include:
    a first signature data element obtained by (i) computing a first quantity from the digital asset and a private cryptographic key corresponding to the public cryptographic key; and (ii) setting the first signature data element to equal a chosen base data element to the power of said first quantity;
    a second signature data element obtained by (i) computing a second quantity from the digital asset and the private cryptographic key; and (ii) setting the second signature data element to equal the base data element to the power of said second quantity;
    a third signature data element obtained by (i) computing a third quantity from the digital asset and the private cryptographic key; and (ii) setting the third signature data element to equal the base data element to the power of said third quantity;
    a fourth signature data element obtained by (i) computing a fourth quantity from the digital asset and the private cryptographic key; and (ii) setting the fourth signature data element to equal the base data element to the power of said fourth quantity; and
    a fifth signature data element obtained by (i) computing a fifth quantity from the digital asset and the private cryptographic key; and (ii) setting the fifth signature data element to equal the base data element to the power of said fifth quantity.

\* \* \* \* \*